United States Patent
Aghai et al.

(10) Patent No.: US 10,212,876 B2
(45) Date of Patent: Feb. 26, 2019

(54) AERIAL DEPLOYMENT PLANTING METHODS AND SYSTEMS

(71) Applicant: DroneSeed Co., Seattle, WA (US)

(72) Inventors: Matthew M. Aghai, Seattle, WA (US); Grant Canary, Seattle, WA (US); John Thomson, Seattle, WA (US); Robert Alexander Krob, Seattle, WA (US)

(73) Assignee: DRONESEED CO., Seattle, WA (US)

( * ) Notice: Subject to any disclaimer, the term of this patent is extended or adjusted under 35 U.S.C. 154(b) by 0 days.

(21) Appl. No.: 15/985,392

(22) Filed: May 21, 2018

(65) Prior Publication Data

US 2018/0263170 A1    Sep. 20, 2018

Related U.S. Application Data

(63) Continuation-in-part of application No. 15/292,059, filed on Oct. 12, 2016, now Pat. No. 10,078,784.

(60) Provisional application No. 62/240,167, filed on Oct. 12, 2015.

(51) Int. Cl.

| | |
|---|---|
| *A61K 36/00* | (2006.01) |
| *A01B 79/00* | (2006.01) |
| *B64C 39/02* | (2006.01) |
| *B64D 1/08* | (2006.01) |
| *A01B 79/02* | (2006.01) |
| *G06Q 10/06* | (2012.01) |
| *G06Q 50/02* | (2012.01) |
| *A23L 11/00* | (2016.01) |

(52) U.S. Cl.
CPC ............ *A01B 79/005* (2013.01); *A01B 79/02* (2013.01); *B64C 39/024* (2013.01); *B64D 1/08* (2013.01); *G06Q 10/063* (2013.01); *G06Q 50/02* (2013.01); *B64C 2201/024* (2013.01); *B64C 2201/108* (2013.01); *B64C 2201/127* (2013.01); *B64C 2201/145* (2013.01)

(58) Field of Classification Search
CPC ................................ A01B 79/00; B64C 39/00
USPC .......................................................... 382/110
See application file for complete search history.

(56) References Cited

U.S. PATENT DOCUMENTS

| | | | |
|---|---|---|---|
| 4,055,473 | A | 10/1977 | Hay |
| 7,764,231 | B1 | 7/2010 | Karr et al. |
| 8,146,539 | B2 | 4/2012 | Robbins |
| 8,682,888 | B2 | 3/2014 | Smith |
| 8,775,428 | B2 | 7/2014 | Birdwell et al. |
| 9,014,516 | B2 | 4/2015 | Boncyk et al. |
| 9,113,590 | B2 | 8/2015 | Johnson |
| 9,131,644 | B2 * | 9/2015 | Osborne |
| 9,137,246 | B2 | 9/2015 | Parry et al. |
| 9,202,252 | B1 | 12/2015 | Smith et al. |

(Continued)

OTHER PUBLICATIONS

Anil K. Rajvanshi, Large Scale Dew Collection as a Source of Fresh Water Supply, Mar. 3, 1981, 299-306, vol. 36, Nimbkar Agricultural Research Institute, India.

(Continued)

*Primary Examiner* — Abolfazl Tabatabai
(74) *Attorney, Agent, or Firm* — Aeon Law, PLLC; Adam L. K. Philipp; Jonathan E. Olson

(57) ABSTRACT

Methods and systems are presented for making good use of recently obtained biometric data and for configuring propagule capsules for deployment via an unmanned vehicle so that each has an improved chance of survival.

18 Claims, 22 Drawing Sheets

(56) References Cited

U.S. PATENT DOCUMENTS

| | | | |
|---|---|---|---|
| 9,237,416 | B2 | 1/2016 | Root et al. |
| 9,268,915 | B2 | 2/2016 | Holmes et al. |
| 9,269,022 | B2 | 2/2016 | Rhoads et al. |
| 9,277,525 | B2 | 3/2016 | Dupray et al. |
| 9,286,511 | B2 | 3/2016 | Chung et al. |
| 9,310,354 | B2 | 4/2016 | Duncan et al. |
| 9,311,605 | B1 | 4/2016 | Mewes et al. |
| 9,336,482 | B1 * | 5/2016 | Mewes |
| 9,336,492 | B1 | 5/2016 | Mewes et al. |
| 9,340,797 | B2 | 5/2016 | Baum et al. |
| 9,354,235 | B2 | 5/2016 | Roberts et al. |
| 9,355,154 | B2 | 5/2016 | Nissen |
| 9,373,051 | B2 | 6/2016 | Viviani |
| 9,373,149 | B2 | 6/2016 | Abhyanker |
| 9,378,065 | B2 | 6/2016 | Shear et al. |
| 9,378,509 | B2 | 6/2016 | Terrazas et al. |
| 9,378,554 | B2 | 6/2016 | Chang et al. |
| 9,383,750 | B2 | 7/2016 | DeMarco et al. |
| 9,390,331 | B2 | 7/2016 | Sant et al. |
| 9,412,140 | B2 | 8/2016 | Molloy et al. |
| 9,420,737 | B2 | 8/2016 | Spiller et al. |
| 9,423,249 | B2 | 8/2016 | Deppermann et al. |
| 2016/0073573 | A1 | 3/2016 | Ethington et al. |

OTHER PUBLICATIONS

Ashok Kumar et al, Does a Plant Growth Promoting Rhizobacteria Enhance Agricultural Sustainability?, Mar. 2015, 715-724, vol. 9(1), Journal of Pure and Applied Microbiology, India.

Daniel I. Leskovar, Root and Shoot Modification by Irrigation, 1998, 510-514, vol. 8(4), HortTechnology, US.

Dumroese RK et al., Subirrigation reduces water use, nitrogen loss, and moss growth in a container nursery, 2006, 253-261, vol. 7(3), Native Plants Journal, USA.

Gavin R. Flematti et al., A compound from Smoke That Promotes Seed Germination, Jul. 8, 2004, vol. 305, Science by American Association for the Advancement of Science, USA.

Govind Gupta et el., Plant Growth Promoting Rhizobacteria (PGPR): Current and Future Prospects for Development of Sustainable Agriculture, Mar. 24, 2015, 96-102, vol. 7(2), Journal of Microbial & Biochemical Technology, India.

J. Derek Bewley, Seed Germination and Dormancy, Jul. 1997, 1055-1066, vol. 9, The Plant Cell by American Society of Plant Physiologists, USA.

Rainwater harvesting/Fog and dew collection, Wikiversity.

Seed Ecology, Department of Horticulture, University of Kentucky, USA.

Shah Fahad et al., Potential role of phytohormones and plant growth-promoting rhizobacteria in abiotic stresses: consequences for changing environment, Nov. 6, 2014, 4907-4921, vol. 22(7), Environmental Science and Pollution Research, Springer-Verlag, Germany.

Steven C Grossnickle et al., Direct Seeding in Reforestation—A Field Performance Review, Dec. 30, 2017, 94-142, vol. 4, Reforesta, Germany.

Steven C. Grossnickle, Stock Quality Assessment: Forecasting Survival or Performance on a Reforestation Site, Jan. 1993, 113-121, vol. 44(3), Tree Planters' Notes, Canada.

Steven C. Grossnickle, Why seedlings survive: influence of plant attributes, May 13, 2012, 711-738, vol. 43, New Forests by Springer Science+business Media B.V.

Steven C. Grossnicle, Importance of root growth in overcoming planting stress, Dec. 21, 2004, 273-294, vol. 30, New Forests, Springer 2005, Canada.

* cited by examiner

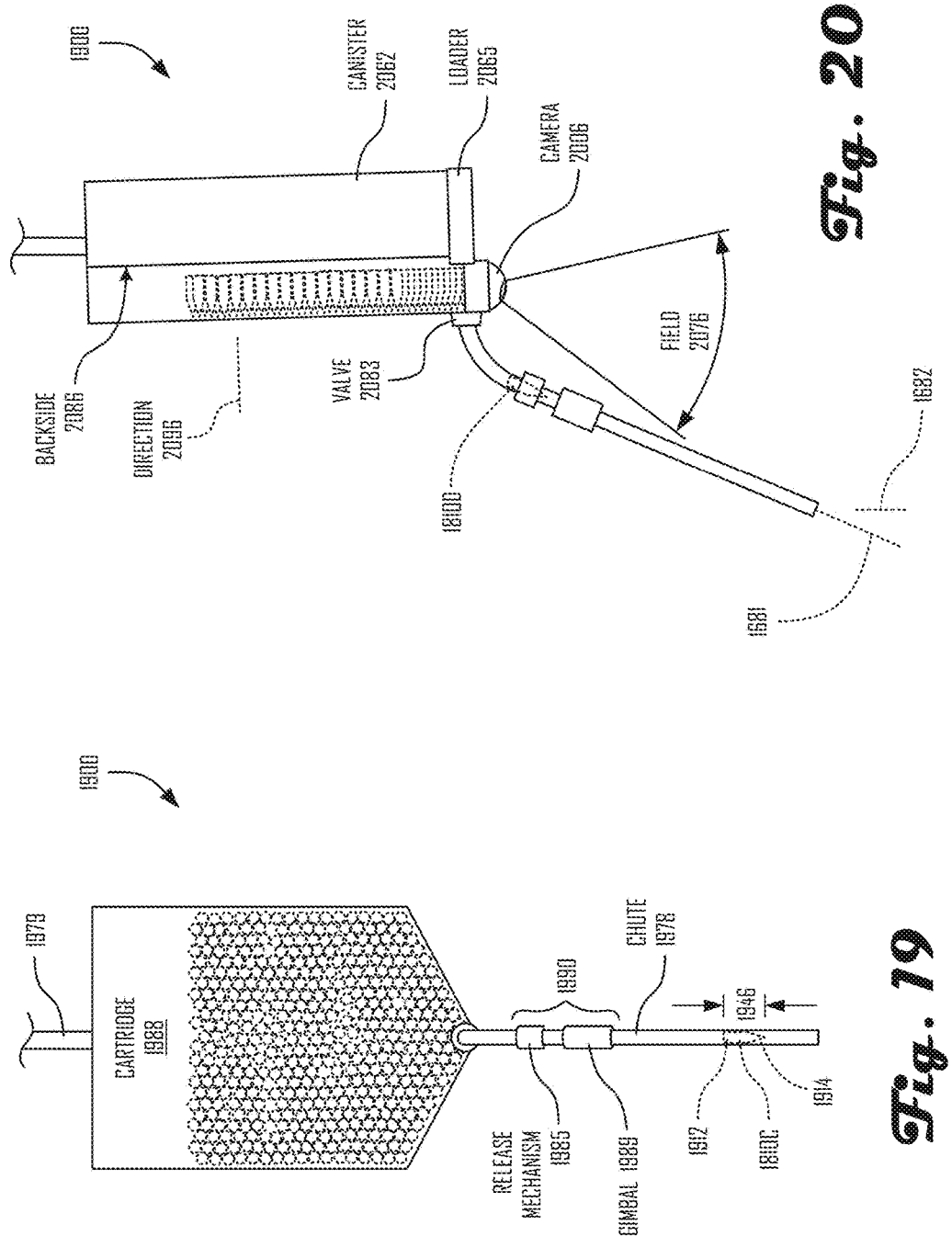

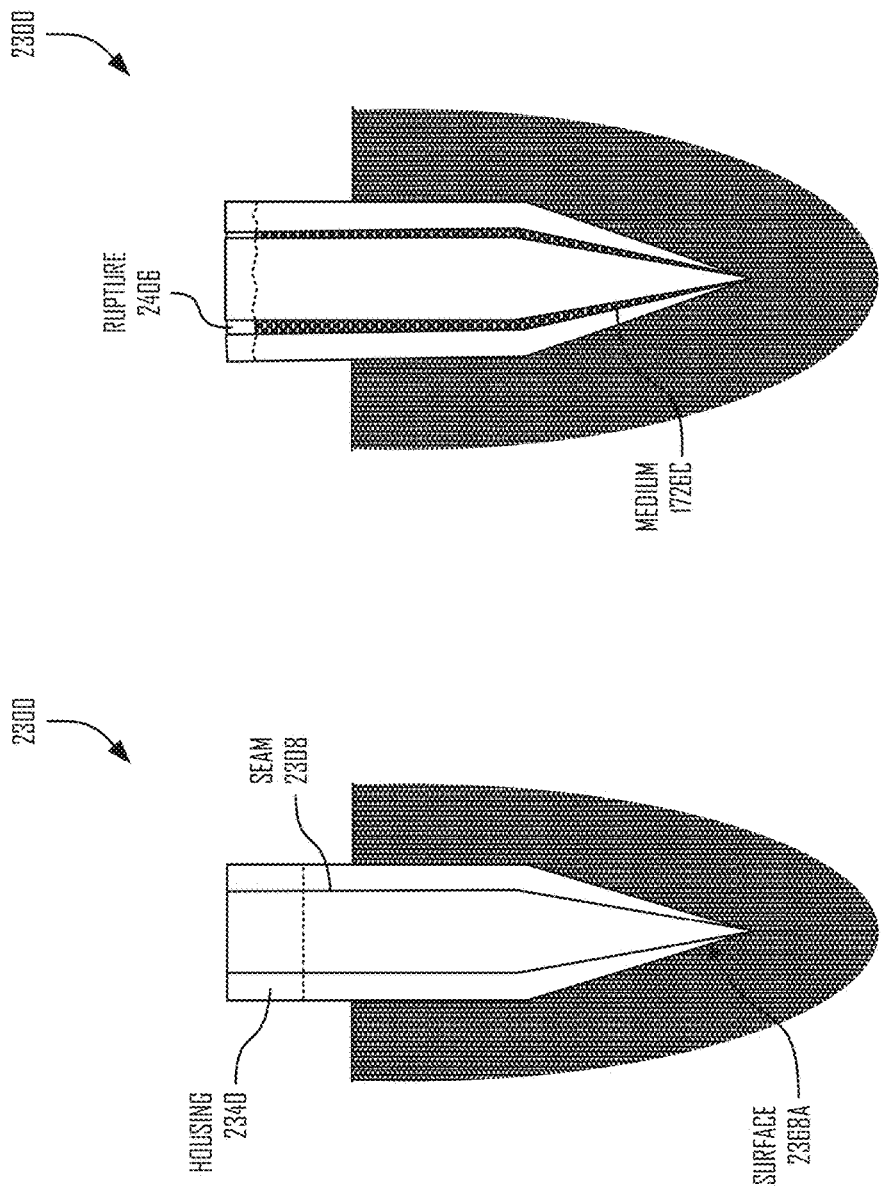

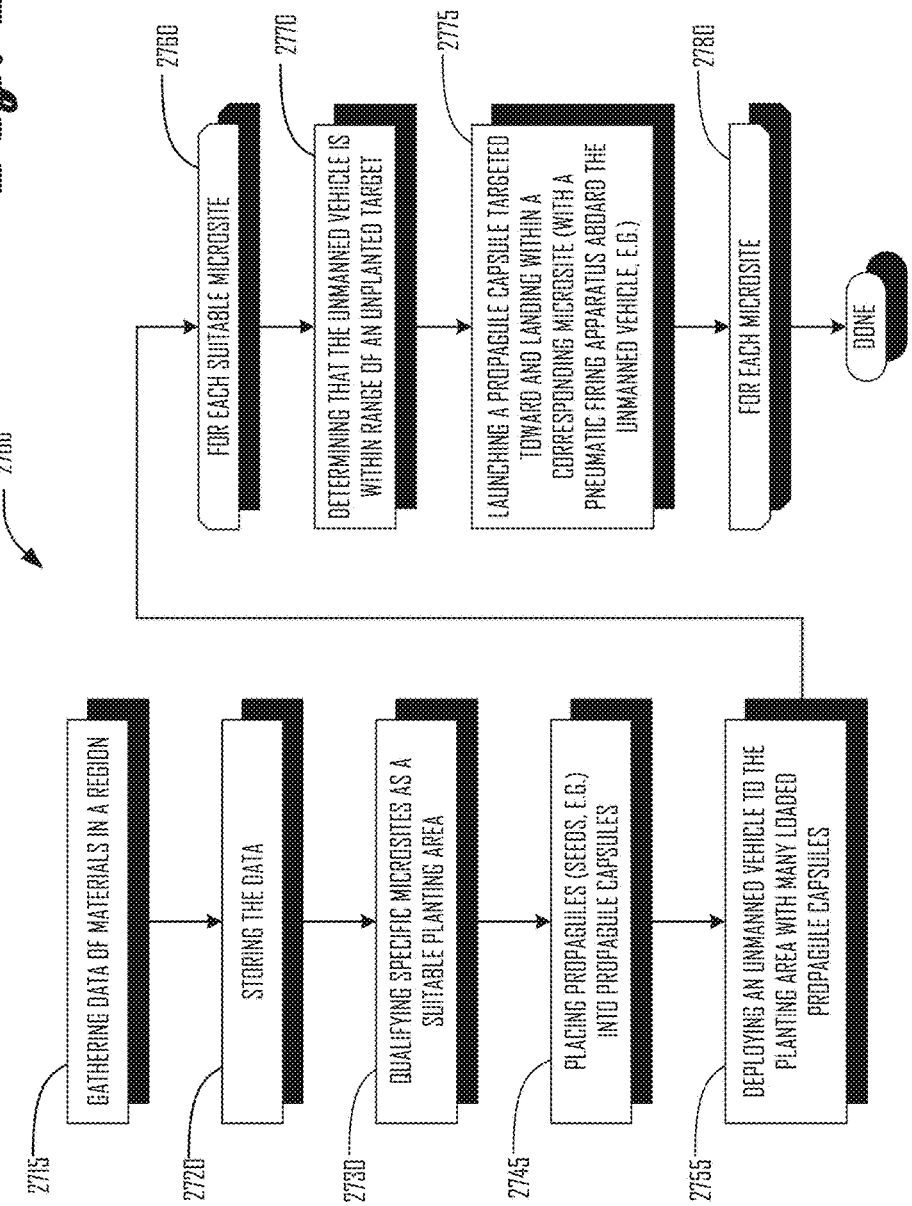

AERIAL DEPLOYMENT PLANTING METHODS AND SYSTEMS

RELATED APPLICATION

This application claims priority to U.S. Provisional App. No. 62/240,167 ("Aerial Tree Planting System and Method of Use") filed 12 Oct. 2015 and to U.S. patent application Ser. No. 15/292,059 ("Forestry Information Management Systems and Methods Streamlined by Automatic Biometric Data Prioritization") and incorporates the same herein by reference in their entirety.

BRIEF DESCRIPTION OF THE DRAWINGS

FIG. 19 illustrates a targeting subassembly in the process of deploying a propagule capsule.

FIG. 20 illustrates the targeting subassembly of FIG. 19 preparing to deploy another propagule capsule.

FIG. 23 illustrates a deployed propagule capsule about to undergo post-deployment changes induced primarily by moisture.

FIG. 24 illustrates the deployed propagule capsule of FIG. 23 having undergone post-deployment structural changes amenable to propagule survival.

FIG. 27 illustrates a flow chart of operations relating to aerial deployment planting.

DETAILED DESCRIPTION

Figure 1:
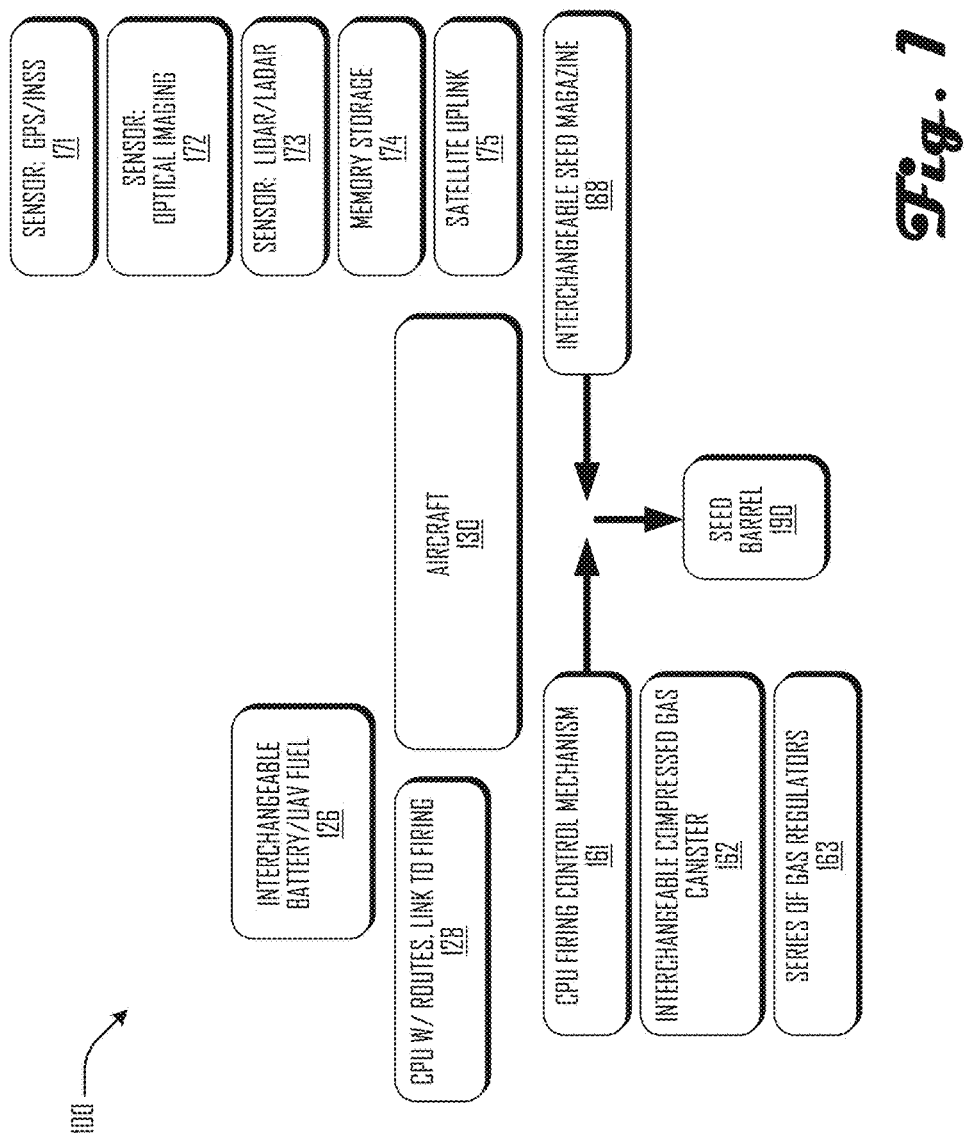
FIG. 1 illustrates an exemplary special-purpose-hardware schematic depicting an aircraft.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote file servers, computer servers and memory storage devices.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used herein a quantity is "about" a value X only if they differ by less than a factor of 3, unless context dictates otherwise. As used herein "numerous" means hundreds or more, unless context dictates otherwise. As used herein a structure is "porous" only if it has numerous moisture-permeable pores (i.e. holes smaller than 5 microns in diameter) pervading therethrough. As used herein a structure is "absorbent" only if it is porous enough to soak up more than 5 microliters of liquid per hour by wicking (capillary action, e.g.).

"Aboard," "about," "above," "absorbent," "advantageous," "aerial," "allowed," "along," "artificial," "at least," "automatic," "balanced," "below," "between," "biodegradable," "biometric," "by," "closed," "compressed," "concentrated," "concerning," "condensed," "conditional," "current," "deployed," "downward," "enhanced," "enough," "extending," "first," "forestry," "forward," "funnel-shaped," "having," "in response," "indicated," "integrated," "lateral," "latticed," "local," "location-specific," "longitudinal," "made of," "narrowest," "near," "non-toxic," "numerous," "obtained," "of," "opened," "optical," "outside," "part," "penetrated," "photographic," "pneumatic," "porous," "prioritized," "processed," "qualified," "received," "remote," "retracted," "said," "scalar," "second," "selected," "selected," "some," "staging," "thereof," "third," "toward," "transmitted," "tubular," "unmanned," "upon," "wherein," "within," or other such descriptors herein are used in their normal yes-or-no sense, not merely as terms of degree, unless context dictates otherwise. In light of the present disclosure those skilled in the art will understand from context what is meant by "remote" and by other such positional descriptors used herein. Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for,"

moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Referring now to FIG. 1, there is shown a system 100 that includes an aircraft 130 usable with the present invention. For the sake of brevity, conventional components related to graphics and image processing, navigation, flight planning, unmanned vehicle controls, and other functional aspects of the unmanned airborne vehicle (UAV) relating to flying may not be described in detail herein.

As shown, system 100 may (optionally) include one or more instances of interchangeable batteries/UAV fuel 126; of a central processing unit (CPU) programmed with routes and a link to firing 128; of a firing control mechanism 161; of an interchangeable compressed gas canister 162; of gas regulator configurations 163; of global positioning (GPS) systems and integrated navigation sensor (INSS) systems 171; of optical imaging sensors 172 (multispectral, hyperspectral, or RGB sensors, e.g.); of LIDAR/LADAR sensors 173; of memory storage 174; of satellite (SAT) uplinks 175. Moreover, the aircraft (UAV, e.g.) may further comprise additional sensor payloads such as thermal image sensors.

The LIDAR/LADAR sensor 173 may (optionally) be configured to measure reflective values of materials, such as soil, on the ground. The measured reflective values are transmitted to the CPU, which determines whether the reflective values fall within a predetermined threshold range. If the reflective values fall within the predetermined threshold, the area is designated as a qualified planting area for trees. If the reflective values fall outside of the predetermined range, the area is disqualified as a planting area. It is contemplated, however, that the present system may be used for planting and monitoring the growth off other types of plants, crops, and the like. Similarly, the hyperspectral image sensor may be used to gain detailed information about the ground. More specifically, the hyperspectral image sensor allows an operator or another end user to "see" the soil, water, and nutrient levels on the ground, particularly in areas that are difficult to access manually. If a spectral signature for an area identifies materials or conditions (or both) suitable for planting, the area is identified as a qualified planting area It is contemplated that the CPU is configured to collect and consolidate multiple data sets of data from various sensors as a key attribute to plotting microsites. In this way, the consolidated data is used to generate a single map for a subsequent planting phase. Additionally, if the data obtained from the LIDAR/LADAR sensor and the hyperspectral sensor or another sensor is inconsistent, then the sensors are configured to re-scan the area until there are no more discrepancies. As such, operators can conduct reconnaissance of a terrain remotely in a convenient and efficient manner.

Measured data and the grid coordinates of the area associated therewith may be stored in the memory unit or transmitted to a remote server via the SAT uplink. Preferably, the grid coordinates are determined via the GPS, INS, or other suitable navigation systems. Additionally, a GPS correction method such as real-time kinematic (RTK) is used to increase the accuracy of the positioning. The areas designated as a qualified planting area may be saved as a part of a planned route for the subsequent planting phase. Within each of the planting areas, a plurality of microsites is identified.

Microsites are points where material delivery operations can occur (where seeds can be planted or herbicides applied, e.g.). Targeted points are selected based on several factors, such as the desired number of plantings per acre, species of plants, surface tension of the soil, soil type, seasonal edaphic factors, biotic limitations (e.g. competing vegetation, presence of herbivores), and beneficial landscape features. The microsites are separated at both regular and irregular intervals, depending upon spacing specified by an expert. In one embodiment, each planting microsite is at a minimum of seven feet apart so as to provide enough room for plant growth but to allow for circumstantial microsite selection.

The aircraft is further equipped with a pneumatic firing apparatus, which comprises a firing control mechanism, a pneumatic system, a plurality of gas regulators, connecting hoses and chambers, and a seed barrel, in which the seed barrel 190 comprises interchangeable seed magazines 188 therein. The foregoing components, including the sensors, memory unit, and the processor as described above, are powered via interchangeable batteries or fuel, depending upon embodiment. Additionally, all of the components on the aircraft are light in weight in order to increase fuel efficiency or to preserve power.

The one or more seed magazines 188 comprise individual seed capsules. The seed capsules comprise a housing that is composed of polyvinyl alcohol or other suitable non-toxic and dissolvable material, in which the housing has a defined interior volume for storing seeds therein. The seed capsules also comprise hydrogels, polymers, or polyacrylamides for preventing the seeds from drying out. Having hydrogels, polymers, or polyacrylamides in the seed capsules and near the roots improves access to water while maintaining aeration. Additionally, the seed capsules further comprise fertilizers, mycorhizal fungi, mycelium, pesticides, herbicides, predator deterrents, or any combination thereof.

As the aircraft flies over the microsites, the pneumatic system is adapted to eject the seed capsules. It is contemplated that the microsites are targeted so that the seed capsules are shot toward the microsites and landed therein. Additionally, the gas regulators optimize the pressure to control the velocity of the seed capsule as it is shot. The velocity may vary depending on various factors such as wind speed, soil surface tension, species preferred germination habit, and the like. In some embodiments, the gas regulators may be adjusted manually or programmed to adjust automatically for different planting areas. Because the seed capsules are dissolvable, the seeds need not be buried or penetrated in soil and allows the root structure of the seed plant to expand without hindrance.

In some variants, the present invention may (optionally) further comprise seed amendment pellets. The pellets comprise a shotgun shell shape and include mycorhizzal fungi inoculated medium, pesticides, herbicides, fertilizers, odors or compounds, hydrogels, beneficial plants, multiple seeds, or any combination thereof.

Referring now to FIG. 2, there is shown a system in which one or more technologies may be implemented. A station 235 (a truck or building, e.g.) is operably linked to a remote network 268 through a satellite uplink or similar signal path as shown. The station is in or near a land tract 250A of interest, with current photographs having been taken via one or more cameras (aboard one or more instances of vessel 230 that was/were then airborne, e.g.) depicting several respective positions 255A-C near the position 255D of station 235. Each vessel 230 may include one or more motor driven propellers 239 (each being an airplane 231 or helicopter 232 or unmanned aerial vehicle 233, e.g.). Alternatively or additionally, such photographs (or location-specific photographic data portion, e.g.) may each be associated with one or more instances of coordinates 253; timestamps 254; times 291, 292, 293 in an event sequence designation (timeline 295, e.g.); biometrics 270 (detected in or computed from a photograph, e.g.) or limits 261, 262, 263 pertaining to a given biometric. For example, a subject matter expert may define one or more ranges 277A-B between pairs of such limits 261-263 as shown.

Figure 3:
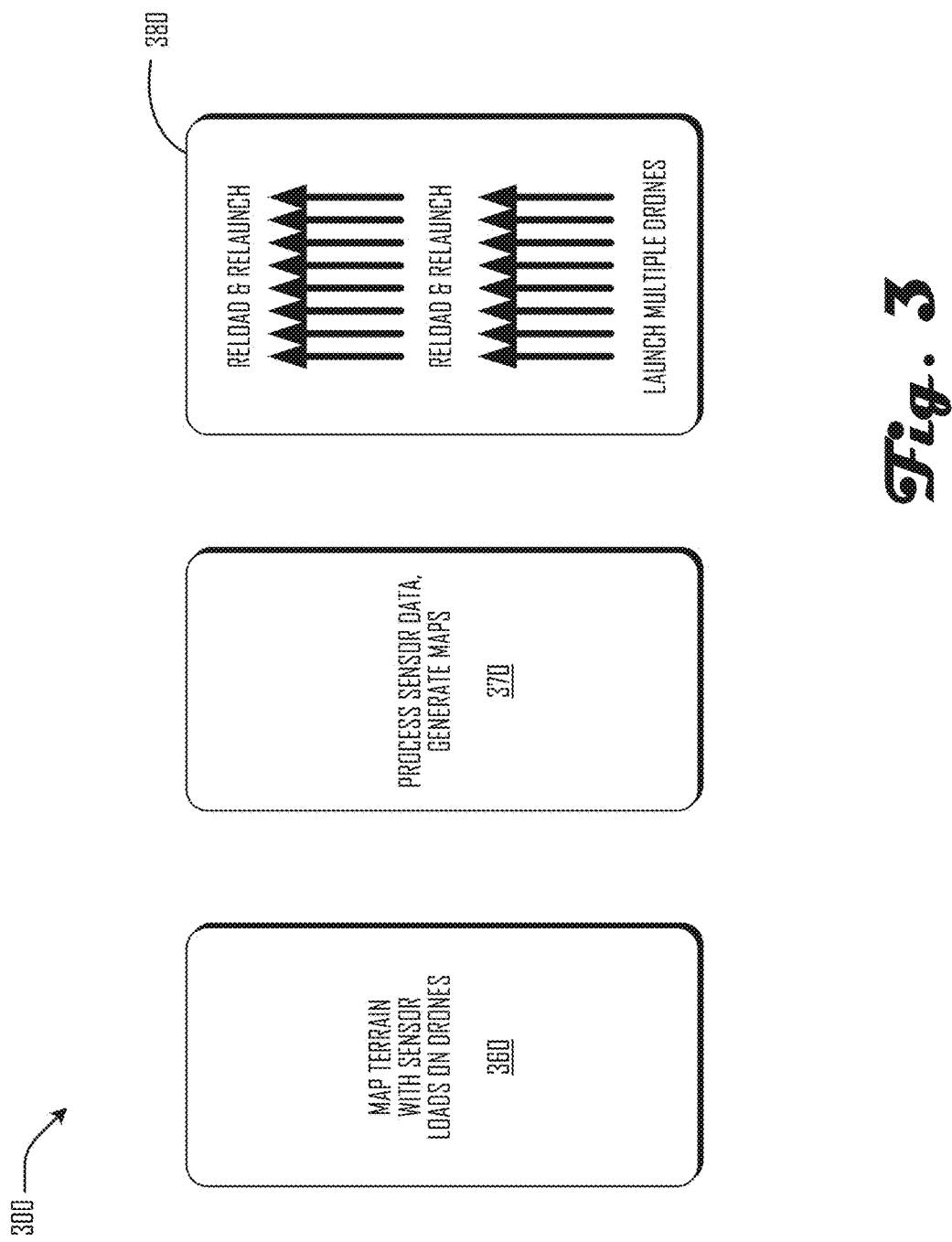
FIG. 3 illustrates an exemplary special-purpose system by which a station thereof interacts with a network.

Referring now to FIG. 3, there is shown an exemplary operational schematic 300 that may reflect one or more technologies of the present system. It is contemplated that multiple instances of UAV 233 can operate concurrently, for example, during two primary phases. Additionally, in some contexts one operator from the ground can control multiple UAVs at one time. In one embodiment, one operator can control approximately ten to fifteen UAVs at one time. In another embodiment, the operator may operate different groups of UAVs at different times. In yet another embodiment, the UAVs may be programmed to operate independently so that an operator is not needed.

During a "reconnaissance" phase 360, UAV 233 flies over an area. While airborne, the sensors of the UAV help identify suitable planting areas and microsites within the planting areas by collecting data. The collected data is processed via the CPU and stored in the memory unit or transmitted to a remote database server. Based on the data, at phase 370, the CPU maps at least one route for planting. Alternatively, the collected data is transmitted to another server or a mapping module on ground that may be configured to perform route mapping.

During a "planting" phase 380, UAV 233 flies over a preplanned route and launches the seed capsules when it is within a shooting range of the microsites. In this way, the UAV can fire encapsulated plant seeds into the ground in places identified as good growing area. Optionally, the UAV may be programmed to fly over the planned route periodically to monitor seed germination and seedling growth.

Figure 4:
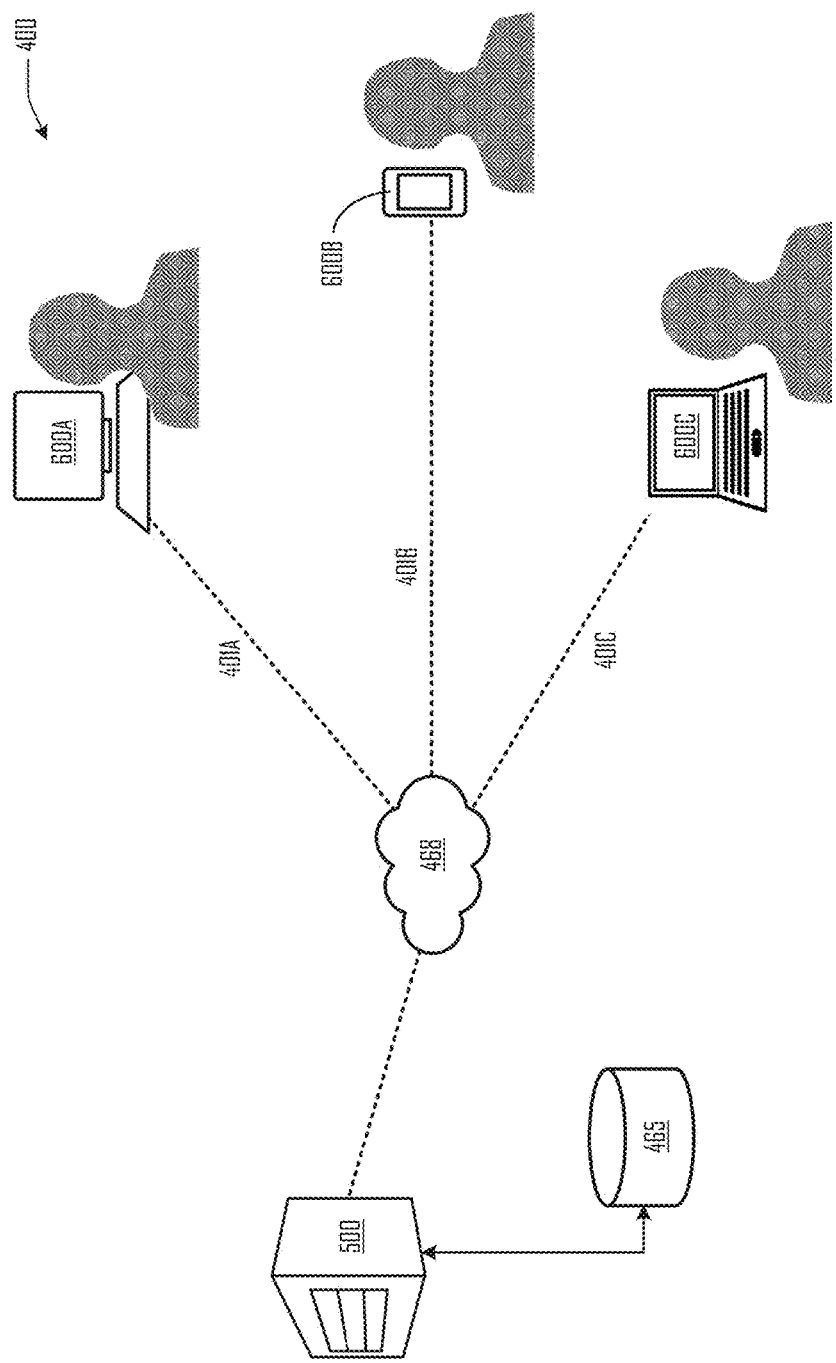
FIG. 4 illustrates an exemplary special-purpose system by which various portable client devices interact with a network.

FIG. 4 illustrates an exemplary network topology of an information management system 400 in accordance with various embodiments. A central information management server 500 (see FIG. 5) is in data communication with a plurality of client devices 600A-C (see FIG. 6) via one or more networks 468. In various embodiments, network 468 may include the Internet, one or more local area networks ("LANs"), one or more wide area networks ("WANs"), cellular data networks, and/or other data networks. Network 468 may, at various points, be a wired and/or wireless network. Remote information management server 500 may be in data communication with one or more information management data stores 465.

In various embodiments, any of client devices 600A-C may be networked computing devices having form factors including general purpose computers (including "desktop," "laptop," "notebook," "tablet" computers, or the like); mobile phones; watches, glasses, or other wearable computing devices. In the example shown in FIG. 4, client device 600A is depicted as a laptop/notebook computer, client device 600B is depicted as a handheld device, and client device 600C is depicted as a computer workstation. In various embodiments there may be fewer or many more respondent devices than are shown in FIG. 4.

As is described in more detail below, in various embodiments, remote information management server 500 may be a networked computing device generally capable of accepting requests over network 468 e.g. from any one of respondent devices 600A-C and/or other networked computing devices (not shown), and providing responses accordingly. In a typical context, one or more devices 600A-B networked together as described herein may rely upon a bandwidth-limited signal path 401A-B and one or more other devices 600C also networked will rely upon a bandwidth-unlimited signal path 401C, the significance of which will be appreciated by one skilled in the art in light of the disclosure that follows. In general, bandwidth-limited signal path 401A-B and the devices 600A-B that rely upon them are not adequate to allow a human user thereof to review pictographic and other bandwidth-intensive data and provide a timely verdict thereon (a diagnosis, work request, or other consequential decision soon enough to make a difference, e.g.).

The functional components of an exemplary information management server 500 that remotely supports advanced interactions with various client devices 600A-C are described below in reference to FIG. 5.

Figure 5:
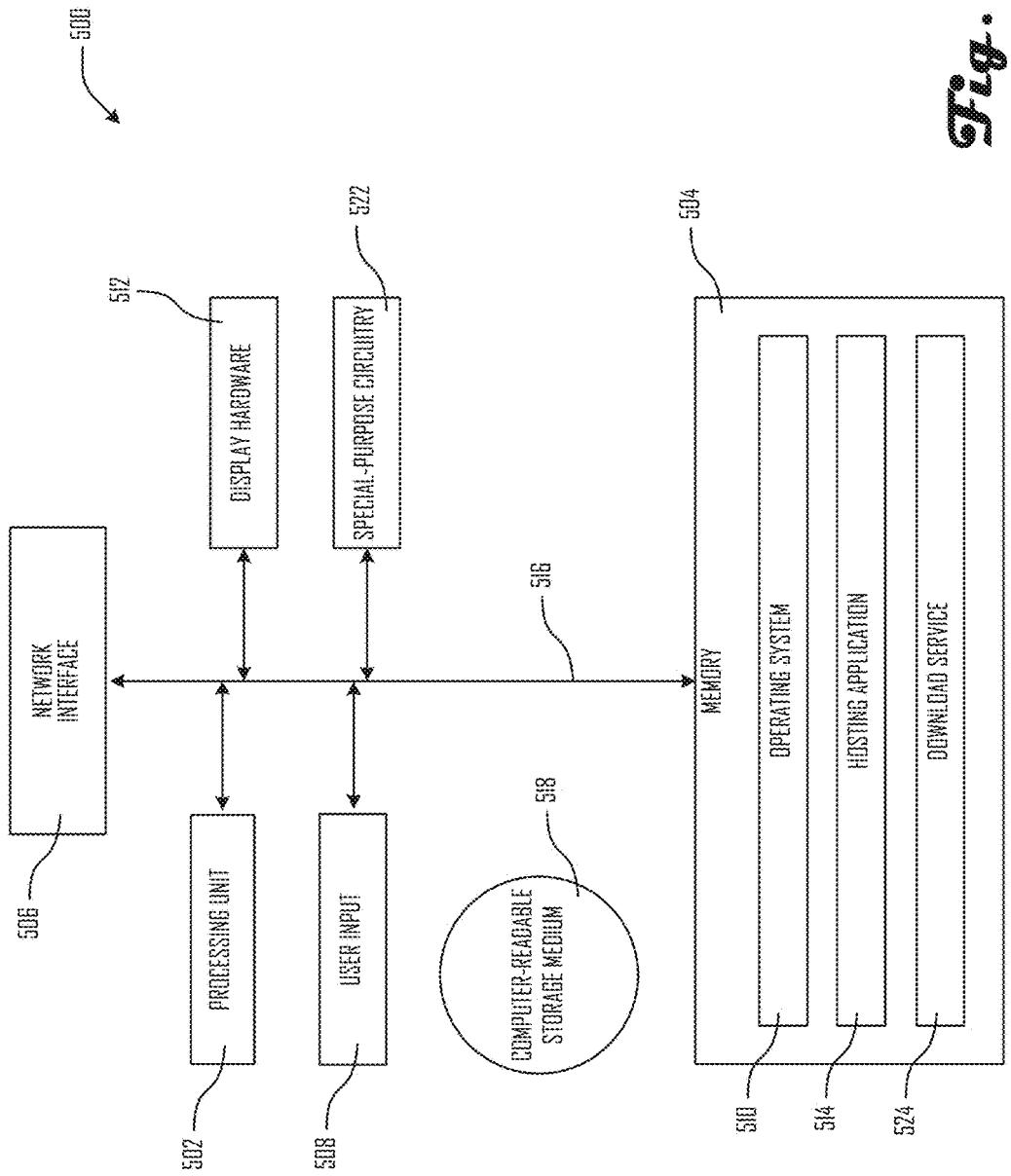
FIG. 5 illustrates a server in which one or more technologies may be implemented.

FIG. 5 illustrates a server 500 in which one or more technologies may be implemented. In respective embodiments, server 500 may be a general-purpose computer or may include special-purpose components not shown. As shown in FIG. 5, exemplary server 500 includes one or more processing units 502 in data communication with one or more memories 504 via one or more buses 516. Each such memory 504 generally comprises some or all of random access memory (RAM), read-only memory (ROM), and/or a permanent mass storage device, such as a disk drive, flash memory, or the like. Client device 500 may also include one or more instances of network interfaces 506, of user inputs 508, of displays 512, or of speakers (not shown).

As shown, memory 504 of exemplary server 500 may store an operating system 510, as well as program code for a number of software applications, such as a client hosting application 514. These and other software components, as well as various data files (not shown) may be loaded into memory 504 via network interface (optional) 506 (or via a selectively removable computer readable storage medium 518, such as a memory card or the like). For hardware functions such as network communications via network interface 506, obtaining data via user input 508, rendering data via display 512 and/or speaker, and alposition of memory 504 to various resources, operating system 510 may act as an intermediary between software executing on server 500 and the server's hardware.

For example, operating system 510 may cause a representation of locally available software applications, such as client hosting application 514, to be rendered locally (via display 512, e.g.). If operating system 510 obtains, e.g. via user input 508, a selection of client hosting application 514, operating system 510 may instantiate a client hosting application 514 process (not shown), i.e. cause processing unit 502 to begin executing the executable instructions of client hosting application 514 and allocate a portion of memory 504 for its use. In some variants, moreover, a download service 524 resident in memory may allow apps (inventoried in medium 518, e.g.) to be downloaded upon request to authorized client devices as described below. Alternatively or additionally, operations described below may be implemented with special-purpose circuitry 522 resident in server 500 as described below.

Although an exemplary server 500 has been described, a server 500 may be any of a great number of computing devices capable executing program code, such as the program code corresponding to hosting application 514. Alternatively or additionally, the structures described with reference to FIG. 5 may likewise be implemented by a special-purpose peer computer in a peer-to-peer network.

Figure 6:
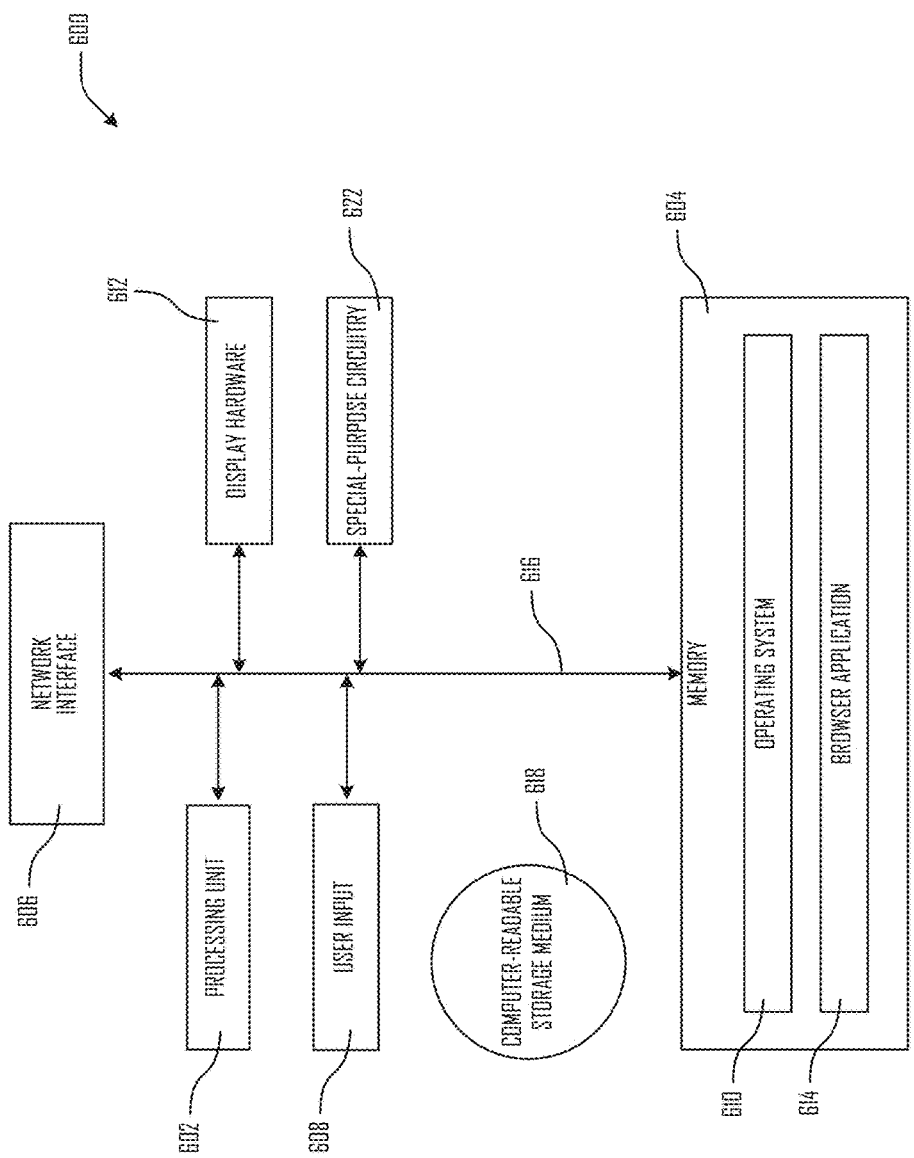
FIG. 6 illustrates a client device in which one or more technologies may be implemented.

FIG. 6 illustrates a client device 600 in which one or more technologies may be implemented. In respective embodiments, client device 600 may be a general-purpose computer or may include special-purpose components not shown. As shown in FIG. 6, exemplary client device 600 includes one or more processing units 602 in data communication with one or more memories 604 via one or more buses 616. Each such memory 604 generally comprises some or all of random access memory (RAM), read-only memory (ROM), and/or a permanent mass storage device, such as a disk drive, flash memory, or the like. Client device 600 may also include one or more instances of network interfaces 606, of user inputs 608, of displays 612, or of speakers (not shown).

As shown, memory 604 of exemplary client device 600 may store an operating system 610, as well as program code for a number of software applications, such as a client web browser application 614. Client web browser application 614 is a software application by which, under server control, client devices can present data to users and transmit data entered by them. These and other software components, as well as various data files (not shown) may be loaded into memory 604 via network interface (optional) 606 (or via a selectively removable computer readable storage medium 618, such as a memory card or the like). For hardware functions such as network communications via network interface 606, obtaining data via user input 608, rendering data via display 612 and/or speaker, and alposition of memory 604 to various resources, operating system 610 may act as an intermediary between software executing on client device 600 and the client device's hardware.

For example, operating system 610 may cause a representation of locally available software applications, such as client web browser application 614, to be rendered locally (via display 612, e.g.). If operating system 610 obtains, e.g. via user input 608, a selection of client web browser application 614, operating system 610 may instantiate a client web browser application 614 process (not shown), i.e. cause processing unit 602 to begin executing the executable instructions of client web browser application 614 and allocate a portion of memory 604 for its use. Alternatively or additionally, operations described below may be implemented with special-purpose circuitry 622 resident in client device 600 as described below.

Figure 7:
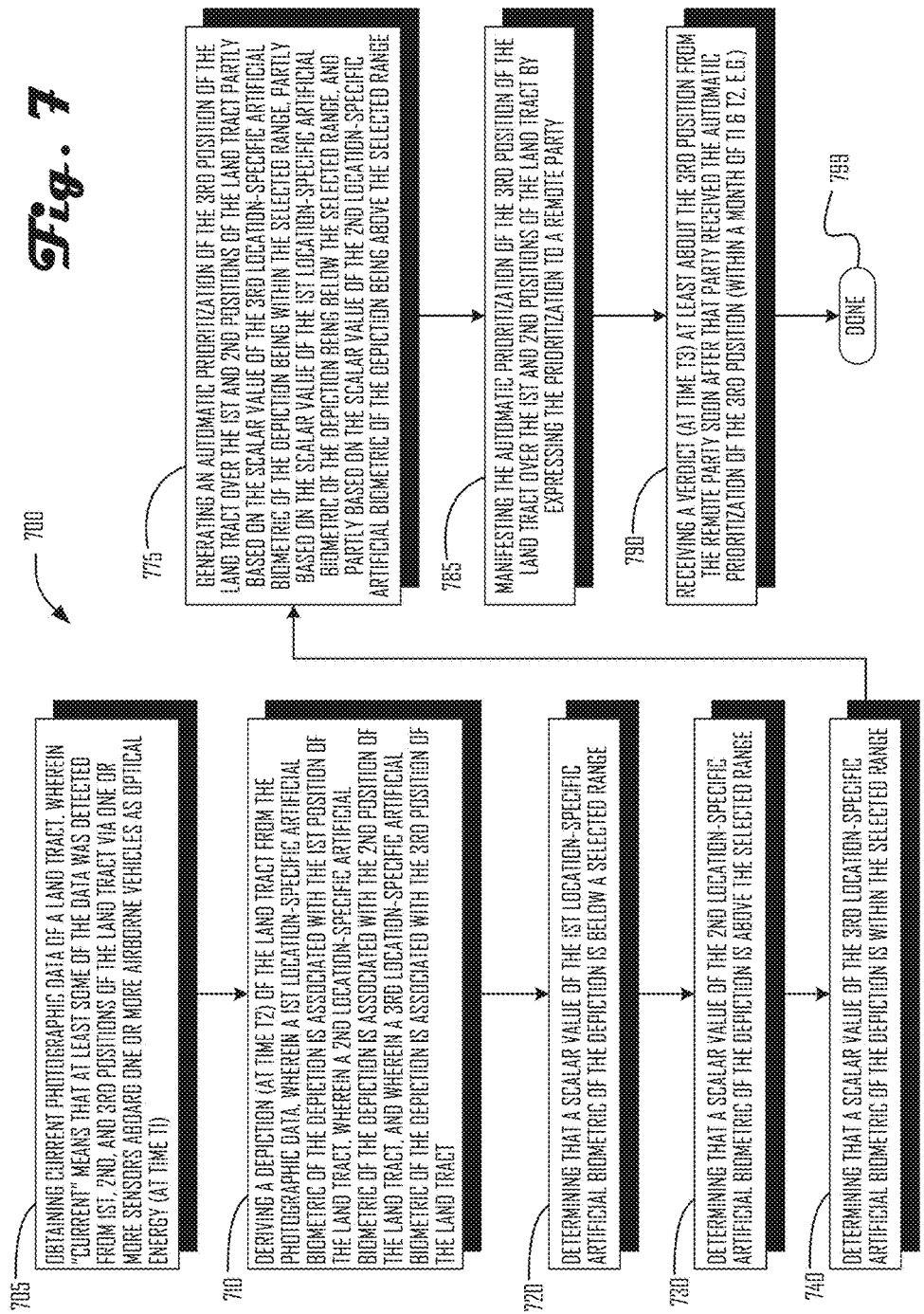
FIG. 7 illustrates a flow chart of an information management routine in accordance with at least one embodiment.

FIG. 7 illustrates an information management routine 700 suitable for use with at least one embodiment. As will be recognized by those having ordinary skill in the art, not all events of information management are illustrated in FIG. 7. Rather, for clarity, only those steps reasonably relevant to describing the forestry information management aspects of routine 700 are shown and described. Those having ordinary skill in the art will also recognize the present embodiment is merely one exemplary embodiment and that variations on the present embodiment may be made without departing from the scope of the broader inventive concept as it is defined by the claims below.

Figure 2:
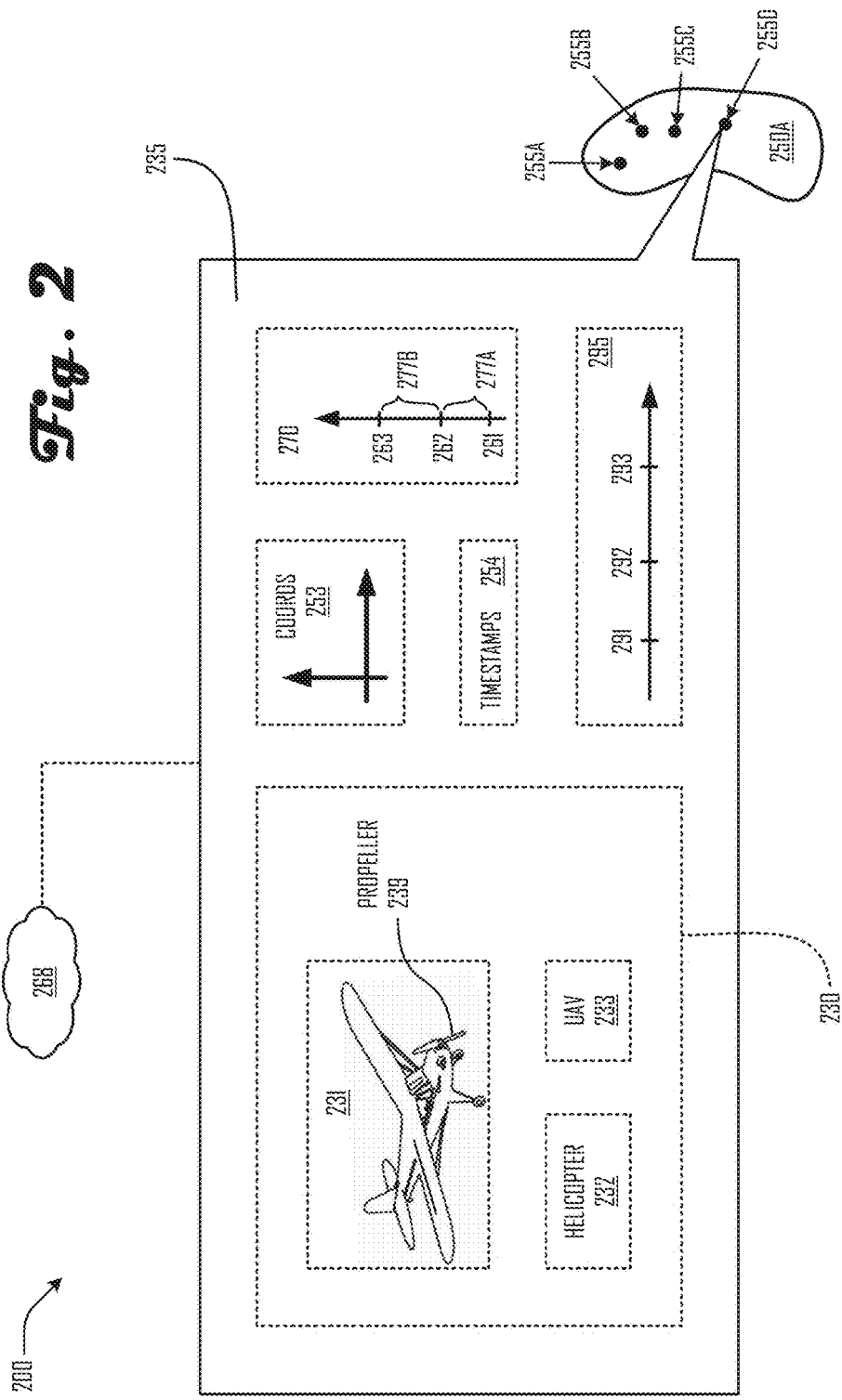
FIG. 2 illustrates an exemplary special-purpose-hardware schematic depicting an aircraft.

Execution block 705 depicts information management routine 700 obtaining current photographic data of a land tract, in which "current" means that at least some of the data was detected from first, second, and third positions of the land tract via one or more sensors aboard one or more airborne vehicles as optical energy less than 3 days ago (at time T1). This can occur, for example, in a context in which the "positions" are respective positions 255A-C depicted in FIG. 2.

Execution block 710 depicts information management routine 700 deriving a depiction (at time T2) of the land tract from the photographic data, in which a first location-specific artificial biometric of the depiction is associated with the first position of the land tract, in which a second location-specific artificial biometric of the depiction is associated with the second position of the land tract, and in which a third location-specific artificial biometric of the depiction is associated with the third position of the land tract. In some variants, execution block 710 may include selectively including a photograph of at least a part of the land tract that overlaps the third position (while omitting from the derived depiction at least some photographic data depicting the first or second positions of the land tract).

As used herein, an "artificial biometric" may refer to a human- or machine-made estimate (measurement or other quantification, e.g.) of one or more physical traits derived to characterize a health-related status of one or more non-animal life forms at a known position. It may describe one or more health-indicative physical traits of fungi or lichen, for example, or to adverse effects (by fire, flood, animal grazing, or infestation, e.g.) upon one or more crops. It may describe colorimetric or other filtered attributes tailored to identify and distinguish a life form of interest from some other having similar attributes (scotch broom versus bracken fern, e.g.). But mere raw optical data (unmodified reflectance or brightness measurements, e.g.) or image data that has merely undergone conventional content-neutral data processing (quantization, encoding, compression, shading, e.g.) is not an "artificial biometric" as used herein. Though many artificial biometrics can be derived from pixel hue in light of teachings herein, for example, those skilled in the art will recognize that mere raw pixel hue and pixel grouping shape are not "artificial biometrics" as used herein.

Distance-indicative artificial biometrics that are derived (at least partly) from optical data and of interest herein include stand dimensions, tree heights, trunk diameters, nearest-crop-tree spacings, and other such distances as well as computations based thereon (averages, multiplicative products, comparisons, or other such computations partly based on elevation, grade, rainfall, or other position-dependent or historical determinants, e.g.).

Execution block 720 depicts information management routine 700 determining that a scalar value of the first location-specific artificial biometric of the depiction is below a selected range. This can occur, for example, in a context in which the range 277A is "selected" by a user of a client device 600A who only plans to be available for diagnoses and decisionmaking via a limited-bandwidth signal path 401A during forestry operations described herein.

Execution block 730 depicts information management routine 700 determining that a scalar value of the second location-specific artificial biometric of the depiction is above the selected range.

Execution block 740 depicts information management routine 700 determining that a scalar value of the third location-specific artificial biometric of the depiction is within the selected range.

Execution block 775 depicts information management routine 700 generating an automatic prioritization of the third position of the land tract over the first and second positions of the land tract partly based on the scalar value of the third location-specific artificial biometric of the depiction being within the selected range, partly based on the scalar value of the first location-specific artificial biometric of the depiction being below the selected range, and partly based on the scalar value of the second location-specific artificial biometric of the depiction being above the selected range.

Execution block 785 depicts information management routine 700 manifesting the automatic prioritization of the third position of the land tract over the first and second positions of the land tract by expressing the prioritization to a remote party.

Execution block 790 depicts information management routine 700 receiving a verdict (at time T3) at least about the third position from the remote party within two days after that party received the automatic prioritization of the third position. This can occur, for example, in a context in which the times T1-T3 are respective event times 291-293 depicted in FIG. 2 and in which a timely verdict could not otherwise be achieved without allowing some other party (onsite at land tract 250A, e.g.) to provide the verdict.

The information management routine 700 ends at termination block 799.

Figure 8:
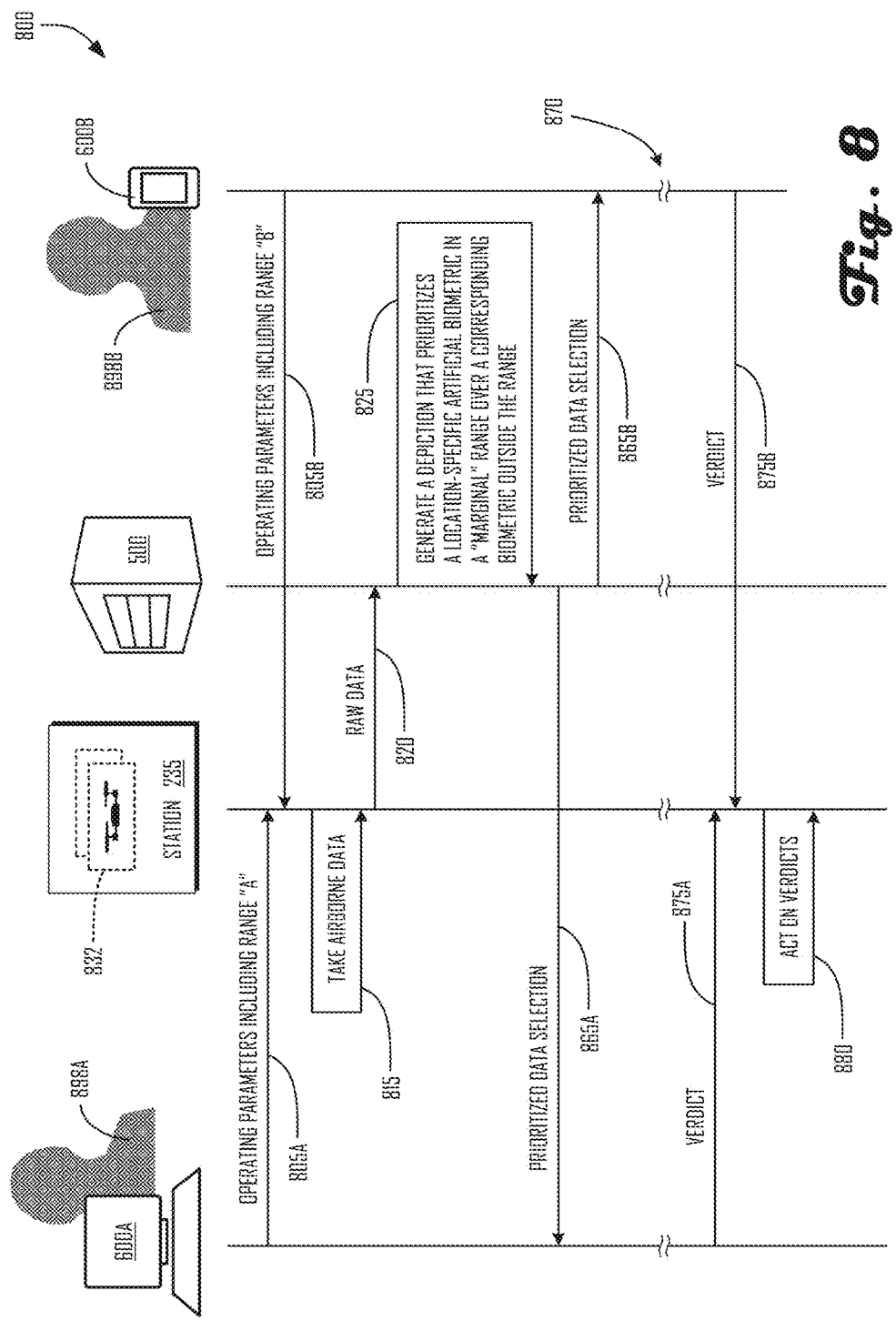
FIG. 8 illustrates a data flow diagram relating to one or more information management routines described herein.

FIG. 8 illustrates a dataflow schematic suitable for use with at least one embodiment. Operational parameters 805A including a biometric range "A" are transmitted from client device 600A to station 235 at which a plurality of drones 832 (instances of aircraft 130, e.g.) are based and operated. Operational parameters 805B including a biometric range "B" are likewise transmitted from client device 600B to station 235. One or more of the drones 832 are accordingly dispatched take airborne data 815 using the received operating parameters 805A-B. In some variants such airborne data 815 may be via one or both of hyperspectral imaging or LIDAR or LADAR (using one or more sensors 172, 173 described above, e.g.) and with the one or more removable/interchangeable compressed gas canisters 162 and seed magazines 188 of that drone 832 left behind to extend that drone's range. Some or all of the current airborne data 815 is then transmitted 820 as raw data 820 to server 500. Server 500 then applies one or both of ranges "A" and "B" to the raw data 820 to determine (by executing block 775, e.g.), where appropriate, an automatic prioritization of the third position 255C of the land tract 250A over the other positions 255A-B of the land tract. This can manifest itself, for example, as a ranking that prioritizes an image of position 255C and causes that image to be transmitted automatically to a client device 600A (in use by and associated with party 898A as shown, e.g.) as an automatic and conditional response to that client device 600A having provided the range "A" within which the third location-specific artificial biometric fell. In some contexts, the depiction containing that image may be large enough (several megabytes or larger, e.g.) so that it only arrives at device 600A overnight (within 16 hours of having been taken, e.g.) by virtue of having been selected (as part of prioritized data selection 865A, e.g.) and sent automatically. This can occur, for example, in a context in which land tract 250A is remote from high-bandwidth connections and in which prioritized data selection 865A omits shape-indicative data pertaining to lower-priority positions 255A-255B for which the location-specific artificial biometrics were out-of-range.

Alternatively or additionally, in some contexts the generating a depiction 825 include a determination (either by server 500 or by a processing unit 602 within vessel 230, e.g.) that an artificial biometric pertaining to a different position 255A may be prioritized as to a different client device 600B (in use by and associated with party 898B as shown, e.g.) by virtue of having fallen within a range 277B provided by that client device 600B. This can occur, for example, in a context in which a corresponding biometric pertaining to position 255B is below range 277B; in which a corresponding biometric pertaining to position 255C is above range 277B; in which the conditional prioritized data selection 865B automatically transmitted to client device 600B is larger than 100 megabytes (including at least an image of position 255A, e.g.) but smaller than 100 terabytes (not including all the current images of land tract 250A in the current raw dataset, e.g.); in which such transmission preceded a long delay 870 (of 24-48 hours, e.g.) only by virtue of having been automatically prioritized and sent; and in which one or more verdicts 875A, 875B (decisions whether to plant or not, e.g.) would otherwise not have been acted upon 880 until a subsequent deployment (when station 235 returned to land tract 250A more than a year later, e.g.).

Figure 9:
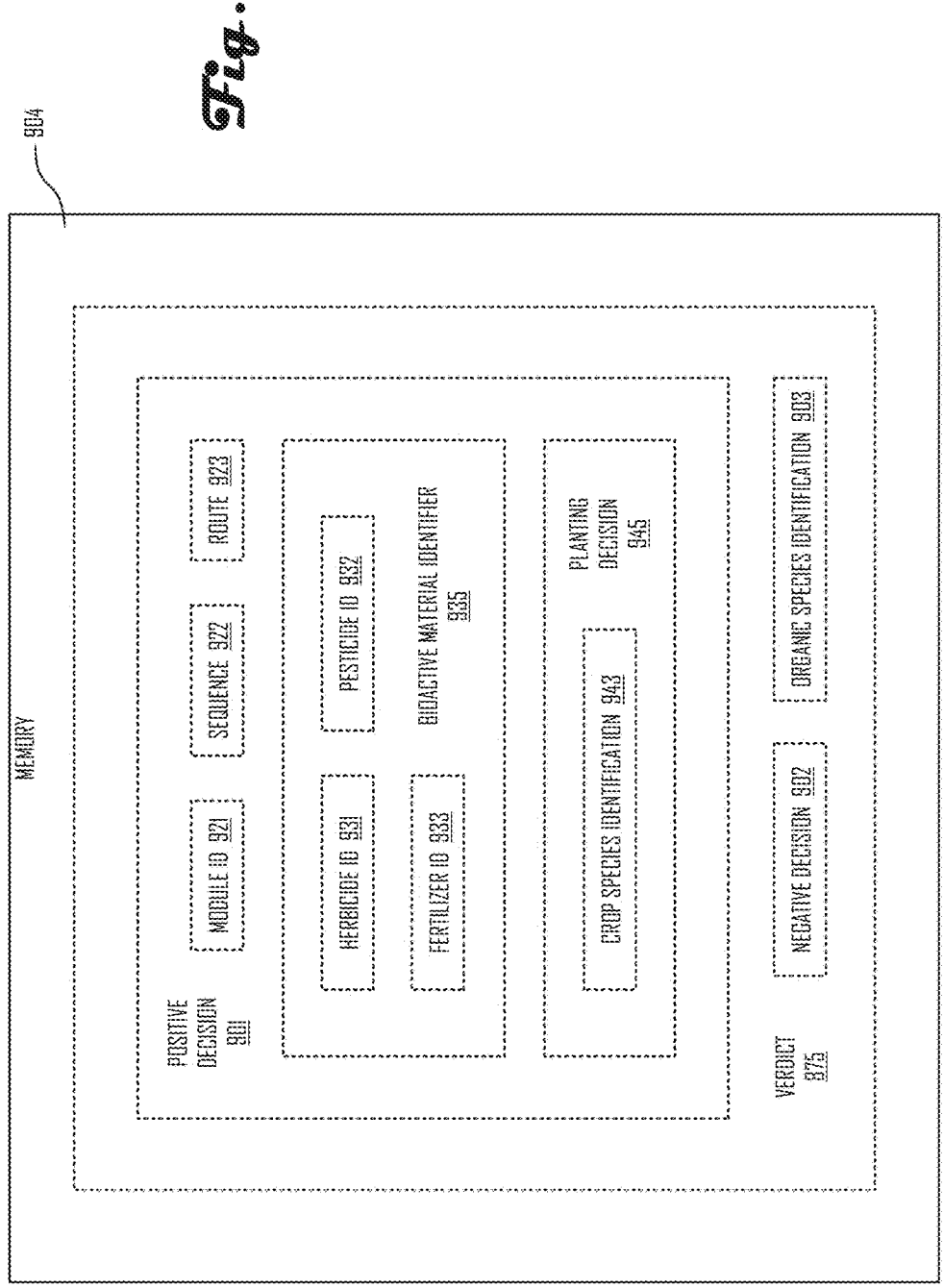
FIG. 9 illustrates various forestry-related verdicts.

FIG. 9 provides a schematic illustration of various forestry-related verdicts 875 as further described herein, residing in a memory 904 (optionally implemented in one or more of the above-described memories 504, 604 or in a drone 832 or other aircraft 130, e.g.). A "verdict" as used herein may refer to any forestry-related determination (a diagnosis, plan of action, a prescription, silvicultural or owner objective(s), quantified estimate, or other judgment) from one or more human authorities (experts or device operators, e.g.) pertaining to consequential deployment actions upon land or vegetation at least partly based on current aerial data. As used herein, "current" data refers to measurements or other values that are affected or otherwise updated by a sensor detection (resulting from optical energy, e.g.) that has occurred in a vicinity under study (at or above a location of interest, e.g.) within six months of such verdict. When no such recent data that pertains to an area is used to ascertain a more recent condition of the vicinity, the older data pertaining to that vicinity is "not current."

Such verdicts 875 may each include one or more instances of positive decisions 901, of negative decisions 902 (not to take an action under consideration, e.g.), of diagnoses (specifying a noxious organism with an organic species identification 903, e.g.), or of additional work requests (analyses and verdicts by other human authorities, e.g.). In some contexts, for example, such positive decisions 901 under consideration may be expressed as one or more portable module identifiers 921 (a serial number effectively determining which bioactive materials to apply to the "third position" under consideration. Alternatively or additionally, a verdict 875 may include one or more task or instruction sequences 922 or defined routes 923 (specifying when and how a drone-implemented delivery flight will be executed, e.g.). Alternatively or additionally, a verdict 875 may include one or more instances of bioactive material identifiers 935 (such as herbicide identifiers 931, pesticide identifiers 932, fertilizer identifiers 933, or other such deliverable cargo, e.g.). Alternatively or additionally, a verdict 875 may express one or more instances of crop species identifications 943 or other components of (positive) planting decisions 945.

Figure 10:
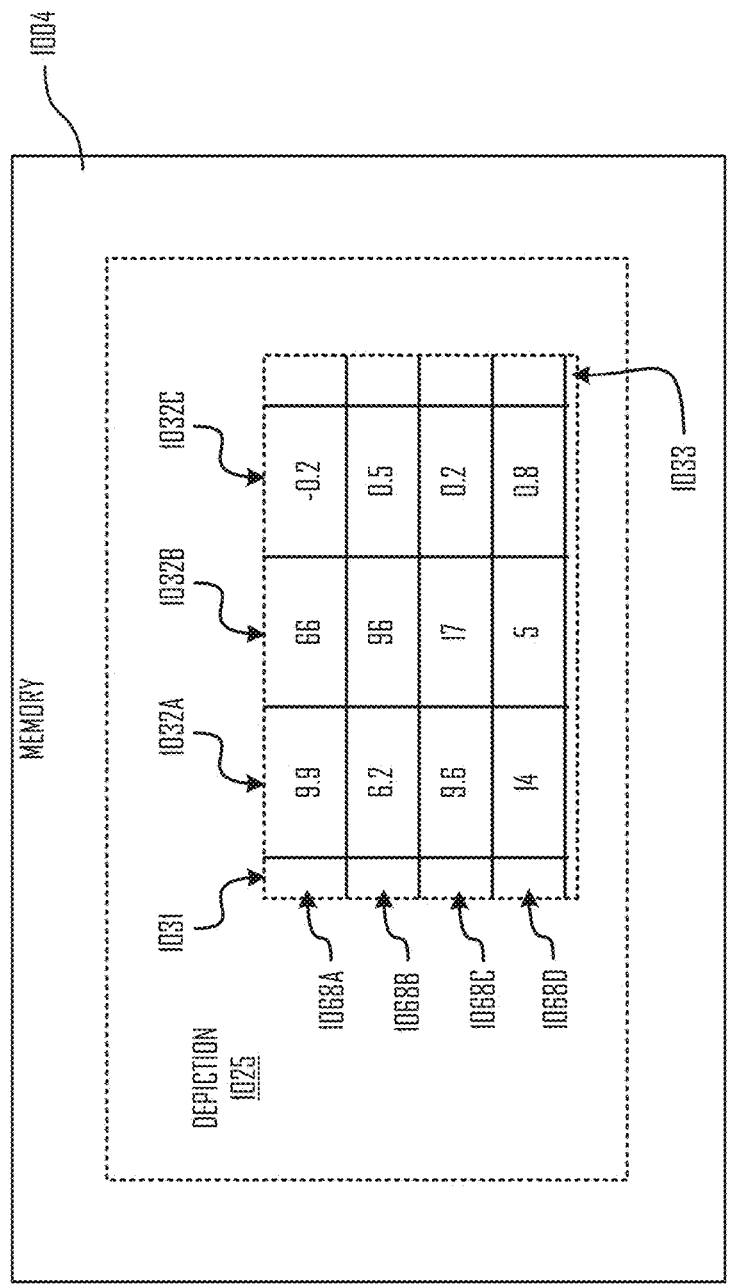
FIG. 10 illustrates various forestry-related depictions.

FIG. 10 provides a schematic illustration of a forestry-related depiction 1025 as further described herein, residing in a memory 1004 (implemented in one or more of the above-described memories 504, 604 or in a drone 832 or other aircraft 130, e.g.). A "depiction" of a land tract as used herein means a dataset that includes one or more photographic, categorical, or other descriptive data components concerning respective parts of the land tract. It may include, in some instances, sets of coordinates 1033 correlated to one or more instances of photographic or schematic images 1031 of physical features of the land as well as scalar determinants 1032A-C with which the images 1031 or coordinates 1033 are correlated. In some variants, for example, such a depiction may include map data (showing historical water features, e.g.) or other such non-biometric determinants 1032A (that may describe soil composition, localized meteorological data, ground elevation, or thermal or precipitation history, e.g.), or other such measurements that may affect but do not directly describe any current occurrence of non-motile organisms living upon tracked positions of the land.

Figure 11:
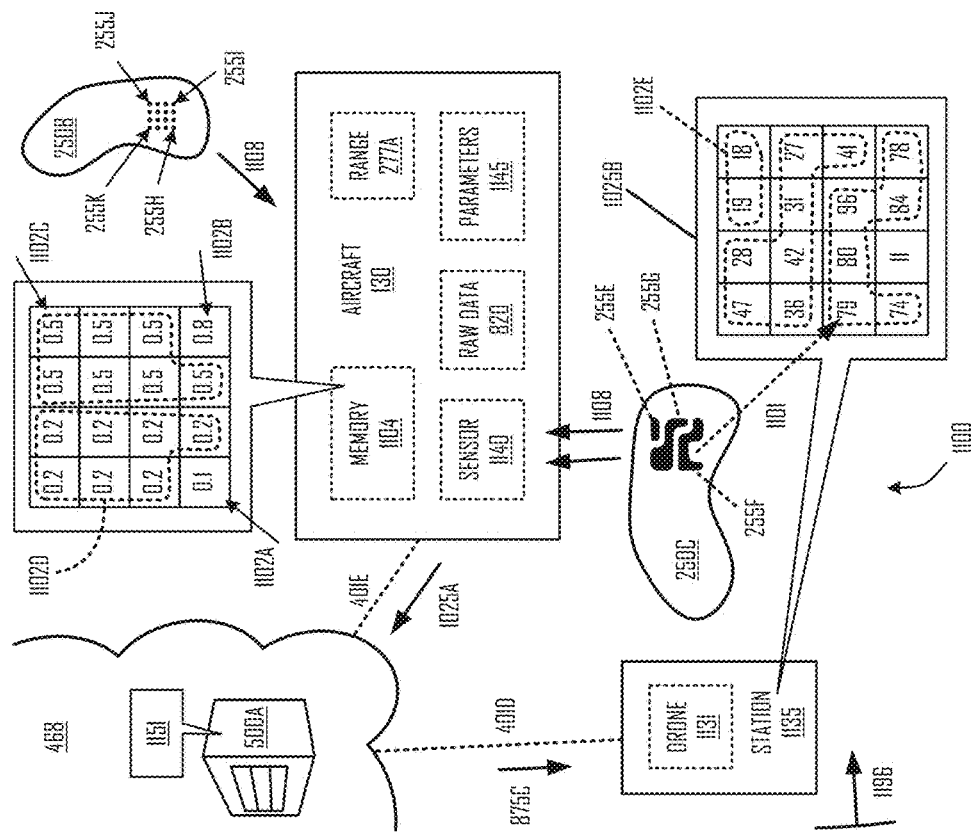
FIG. 11 illustrates a schematic of a physical system relating to one or more information management routines described herein.

FIG. 11 illustrates an information management system 1100 configured to interact with one or more other tracts 250B-C to which one or more aircraft 130 as described herein may be deployed. In a first deployment, one or more sensors 1140 aboard aircraft 130 receive and detect energy 1108 from several positions 255E-G of tract 250B which is manifests as raw digital data 820 (described with reference to FIG. 8, e.g.) in memory 1104. Also a portion of raw data 820 is distilled into a depiction 1025A that includes a current location-specific artificial biometric 1102A-E for each of the positions 255 as shown. The depiction 1025A may also include some of the photographic data 1389 initially captured by the one or more sensors 1140. In some variants a CPU 118 aboard aircraft 130 may be configured to streamline its operations by redacting portions of the photographic data (see FIG. 13) that are unduly duplicative (depicting some or all images of positions 255J for which a significant biometric is not of great interest by virtue of being well understood, e.g.). This can occur, for example, in a context in which a marginal range 277A is selected (via a botanical consultant using one or more client devices 600A-B remote from tract 250B, e.g.) so that a lower limit 261 is below 0.2 and so that an upper limit 252 is 0.4; in which a first location-specific artificial biometric 1102A (currently describing position 255H, e.g.) is below the marginal range 277A; in which a second location-specific artificial biometric 1102B (currently describing position 255I, e.g.) is above the marginal range 277A; in which a third location-specific artificial biometric 1102D (currently describing position 255K, e.g.) is within the marginal range 277A; in which the botanical consultant receives a prioritization 1151 as a real-time response to a large patch of vegetation exhibiting a biometric 1102D within the marginal range 277A having been detected (at server 500A, e.g.); in which the consultant has set a limit (a number of square meters as one of the on-board parameters 1145, e.g.) as to what constitutes a "large patch"; in which no real-time response would otherwise have been sent to the consultant; in which some signal paths 401A-D is effectively bandwidth-limited but other signal paths 401E of interest are not; and in which the consultant would not otherwise have been able to provide a verdict 875C in time to avoid a wasted opportunity (to include position 255K and the rest of the patch in one or more drones 1131 applying an herbicide to a large adjacent part of tract 250B that includes position 255H, e.g.).

In some contexts current data depicting a first microsite (position 255K, e.g.) may be used to characterize an entire "third" position even when that position has been extended to include a succession of additional adjacent microsites partly based on the value of the biometric of each microsite in the succession being within the range 277 and partly based on each microsite of the succession being adjacent another microsite of the succession. The effects of such algorithmic extensions are evident, for example, in the irregular shapes of positions 255E-G.

In a later deployment, one or more sensors 1140 (described with reference to FIG. 1, e.g.) aboard aircraft 130 receive and detect energy 1108 from several irregularly-shaped positions 255E-G of tract 250C which is then recorded as raw digital data 820 in memory 1104. This can occur, for example, in a context in which a depiction 1025B reflecting this data is downloaded via signal path 401D while station 1135 is in a vicinity 1196 of tract 250C; in which depiction 1025B manifests a biometric map (having biometric values manifested as a likelihood-indicative or other percentage as shown, e.g.) or programmed navigation routes for one or more drones 1131, e.g.); and in which such information flow 1101 (via server 500A and signal paths 401D-E, e.g.) includes a prioritization 1151 and verdict 875C as described below. This can occur, for example, in a context in which the range has a lower limit of 20-25 and an upper limit of 50-70; and in which the "third" position is position 255G.

Figure 12:
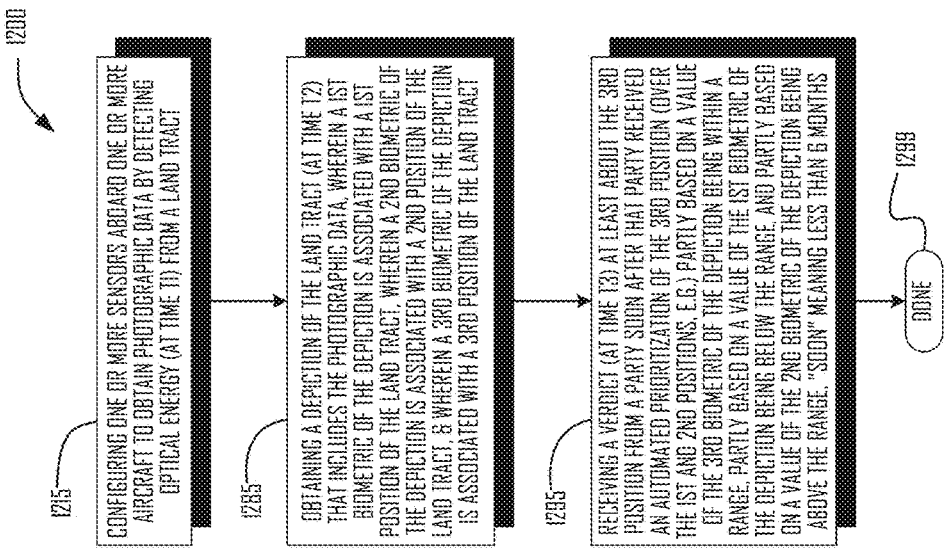
FIG. 12 illustrates another flow chart of an information management routine in accordance with at least one embodiment.

FIG. 12 illustrates an information management routine 1200 suitable for use with at least one embodiment. As will be recognized by those having ordinary skill in the art, not all events of information management are illustrated in FIG. 12. Rather, for clarity, only those steps reasonably relevant to describing the forestry information management aspects of routine 1200 are shown and described. Those having ordinary skill in the art will also recognize the present embodiment is merely one exemplary embodiment and that variations on the present embodiment may be made without departing from the scope of the broader inventive concept as it is defined by the claims below.

Execution block 1215 depicts configuring one or more sensors aboard one or more aircraft to obtain photographic data in memory thereof by detecting at least some optical energy at a first time T1 from a land tract (one or more client devices 600A-B remotely configuring one or more sensors 1140 aboard one or more drones 1131 or airborne vehicles to obtain photographic data in memory thereof by detecting optical energy 1108 at a "first" time 291 from land tract 250C, e.g.). This can occur, for example, in a context in which the one or more client devices 600A-B are "remote" by virtue of being more than 100 kilometers from land tract 250C. Alternatively or additionally, the memory may contain map data (indicating historical waterway positions or other indications of potential hazards, e.g.) or other background information that may affect current depiction 1025B. In some variants, moreover, execution block 1215 may be performed by server 500A or concurrently performed by a party (a device user operating device 600B, e.g.).

Execution block 1285 depicts obtaining a current depiction of a land tract that includes photographic data from one or more airborne vehicles, wherein a first location-specific artificial biometric of the current depiction is associated with a first position of the land tract, wherein a second location-specific artificial biometric of the current depiction is associated with a second position of the land tract, and wherein a third location-specific artificial biometric of the current depiction is associated with a third position of the land tract (a drone 1131, station 1135, or other client device 600 generating or receiving one or more biometric maps or similar depictions 1025 that include photographic data depicting a tract 250 as described herein, e.g.). In many contexts, such depictions are in fact obtained by a succession of devices that pass them along.

Execution block 1295 depicts receiving a verdict concerning said third position of said land tract from a party who has received a prioritization of said third location-specific artificial biometric of the current depiction over said first and second location-specific artificial biometrics of the current depiction partly based on a scalar value of said third location-specific artificial biometric of the current depiction being within a selected range, partly based on a scalar value of said first location-specific artificial biometric of the current depiction being below said selected range, and partly based on a scalar value of said second location-specific artificial biometric of the current depiction being above said selected range (a drone 1131, station 1135, or other client device 600 receiving a verdict 875 concerning said third position 255 from a party who has received such a prioritization 1151, e.g.). In many contexts, such verdicts 875 are in fact obtained by a succession of devices that pass them along.

The information management routine 1200 ends at termination block 1299.

Figure 13:
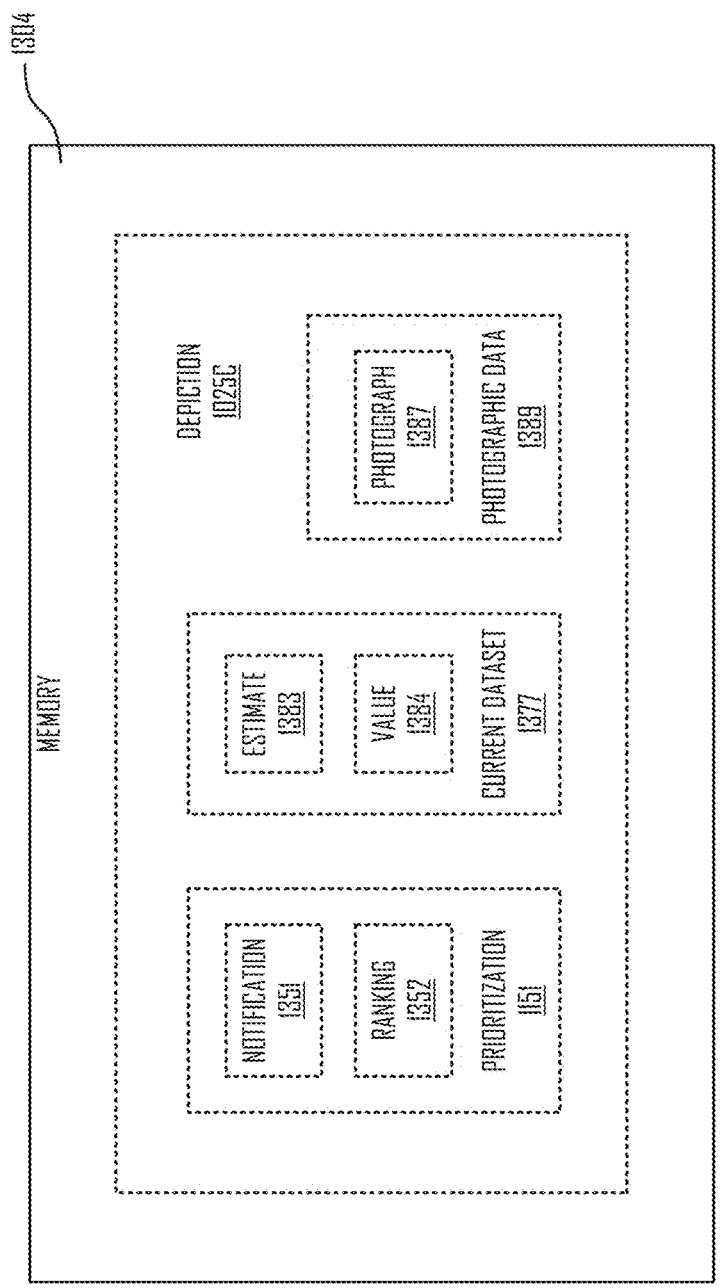
FIG. 13 illustrates additional aspects of various forestry-related depictions.

FIG. 13 illustrates another forestry-related depiction 1025C, residing in a memory 1304 (implemented in one or more of the above-described memories 904, e.g.). As an alternative to or in addition to the above-described datasets, depiction 1025C may include one or more instances of prioritizations 1151 (including one or more instances of conditional notifications 1351 or of rankings 1352, e.g.) or of current datasets 1377 (each including one or more instances of current estimates 1383 or of current scalar values 1384 as further described below, e.g.), or of photographic data 1389 (including one or more photographs 1387 obtained by one or more optical imaging sensors 172 or LIDAR/LADAR sensors 173 receiving energy 1108, e.g.) in conjunction with one or more instances of timestamps 254 or coordinates from sensor 171. Such estimates 1383 may include, for each of the positions of interest, one or more of a distance estimate, a rate estimate, a concentration estimate, an occurrence estimate, a health-difference index, or a combination of the above (as a biometric or otherwise, depending on what it measures).

As used herein, a "prioritization" may refer to a conditional automatic notification (requesting an expedited verdict selectively in response to some datasets 1377B-C but not to other datasets 1377A, e.g.), a ranking (listing the prioritized item before one or more other items, e.g.), or some other expression signifying elevated importance relative to that of a nearby position (microsite, e.g.) or its attributes. In some contexts, respective "prioritizations" may be different for different parties, such as in a context in which client device 600A prioritizes record 1068A over one or more other depicted records in response to "66" falling within range "A" (as shown in FIG. 8) and in which client device 600B prioritizes record 1068B over one or more other depicted records in response to "0.5" falling within range "B." This can make a significant difference, for example, in a context in which such ranking triggers a selective automatic download of prioritized records; in which a full-resolution image 1031 is adequate to ensure a correct outcome in one or more of the verdicts 875 at issue and in which a lower-resolution image 1031 is not; in which full-resolution images 1031 for the thousands of records 1067 of a given land tract not feasible via a limited bandwidth connection to one or both of the client devices 600 via which the respective prioritizations 1151 are downloaded; and in which the correct and timely outcomes of at least some verdicts 876 at issue would not otherwise be feasible without a substantial hardware upgrade (to improve bandwidth of linkages 401A-B, e.g.).

Figure 14:
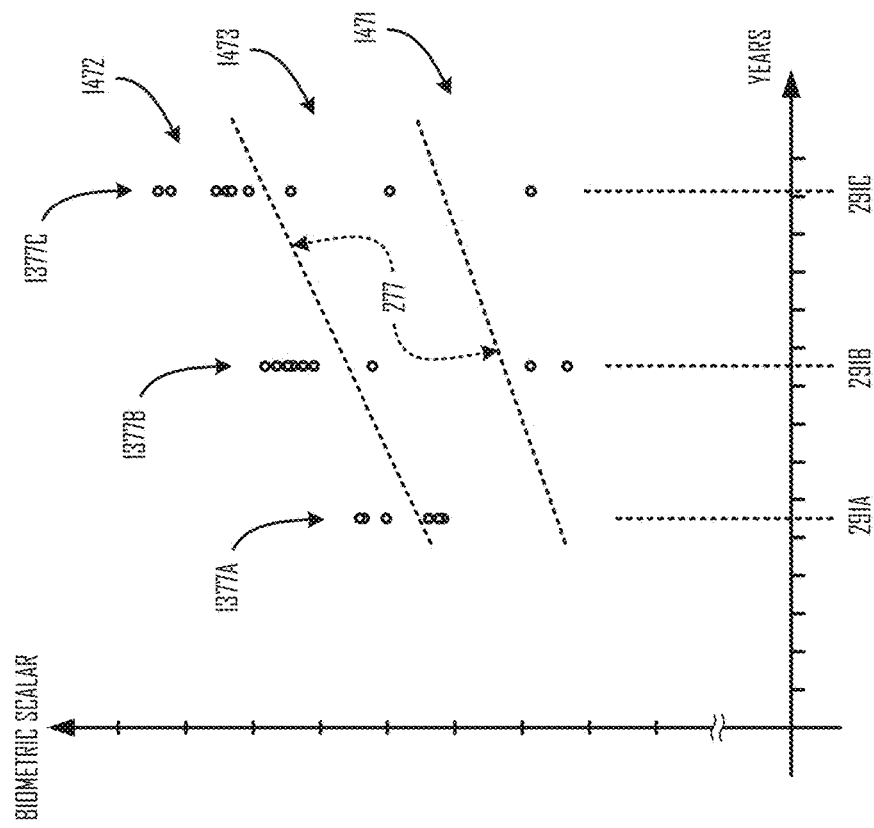
FIG. 14 illustrates a scatter plot depicting scalar biometric datasets derived from raw data taken at several different times and a time-dependent scalar biometric range to which each such dataset pertains.

FIG. 14 illustrates a scatter plot depicting a range 277 having upper and lower limits that both increase as a function of one or more determinants (time, e.g.) with a succession of current datasets 1377A-C each separated by several years. In light of teachings herein, one skilled in the art will be able to identify various health-indicative or growth-indicative artificial biometrics for which such a time-dependent range 277 would be appropriate. A botanist or other expert who is on call for making time-critical verdicts 875 in marginal cases, for example, may in some contexts prefer to select such a range 277 (to minimize false positive and negative priority determinations over time, e.g.) to be calculated. At a first (nominal) time 291A (within a week of the average timestamped date, e.g.) a dataset 1377A includes several location-specific artificial biometrics of the then-current depiction 1025 that are within a selected range 277 as well as several location-specific artificial biometrics of the then-current depiction 1025 that are above the selected range 277. It will be noted that no location-specific artificial biometrics of the then-current depiction 1025 are below the selected range 277.

In each of datasets 1377B-C, several location-specific artificial biometrics of the then-current depiction 1025 are above the selected range 277. In dataset 1377B, at least one location-specific artificial biometrics of the then-current depiction 1025 is within the selected range 277, suggesting that said biometric (and the "third" position to which it pertains) deserves a higher priority 1151 than one or more of the other (over-limit or under-limit) biometrics in the dataset 1377B (nominally) corresponding to the same time 291B. Likewise in dataset 1377C, a plurality of location-specific artificial biometrics of the then-current depiction 1025 (nominally taken at time 291C pursuant to execution block 705, e.g.) is within the selected range 277, suggesting that said biometrics (and the "third" positions to which they pertain) are "more marginal" and deserving of higher prioritization (ranking or conditionally urgent treatment, e.g.) than some or all of the other (over-limit or under-limit) biometrics in dataset 1377C. Many datasets 1377 described herein warrant special handling of within-range location-specific biometric values 1473 as contrasted with that of corresponding under-limit values 1471 and over-limit values 1472.

In light of teachings herein, numerous existing techniques may be applied for configuring special-purpose circuitry or other structures effective for obtaining and applying limits to biometric values as described herein without undue experimentation. See, e.g., U.S. Pat. No. 9,420,737 ("Three-dimensional elevation modeling for use in operating agricultural vehicles"); U.S. Pat. No. 9,378,554 ("Real-time range map generation"); U.S. Pat. No. 9,373,149 ("Autonomous neighborhood vehicle commerce network and community"); U.S. Pat. No. 9,354,235 ("System and process for quantifying potentially mineralizable nitrogen for agricultural crop production"); U.S. Pat. No. 9,340,797 ("Compositions and methods for control of insect infestations in plants"); U.S. Pat. No. 9,310,354 ("Methods of predicting crop yield using metabolic profiling"); U.S. Pat. No. 9,412,140 ("Method and system for inspection of travelers"); U.S. Pat. No. 9,378,065 ("Purposeful computing"); U.S. Pat. No. 8,682,888 ("System and methods for tasking, collecting, and dispatching information reports"); U.S. Pat. No. 9,423,249 ("Biometric measurement systems and methods"); U.S. Pat. No. 9,286,511 ("Event registration and management system and method employing geo-tagging and biometrics"); U.S. Pat. No. 9,268,915 ("Systems and methods for diagnosis or treatment"); U.S. Pat. No. 9,137,246 ("Systems, methods and apparatus for multivariate authentication"); and U.S. Pat. No. 9,014,516 ("Object information derived from object images"). These documents are incorporated herein by reference to the extent not inconsistent herewith.

In light of teachings herein, numerous existing techniques may be applied for configuring special-purpose circuitry or other structures effective for manifesting and implementing priorities and verdicts as described herein without undue experimentation. See, e.g., U.S. Pat. No. 9,311,605 ("Modeling of time-variant grain moisture content for determination of preferred temporal harvest windows and estimation of income loss from harvesting an overly-dry crop"); U.S. Pat. No. 9,390,331 ("System and method for assessing riparian habitats"); U.S. Pat. No. 9,383,750 ("System for predictively managing communication attributes of unmanned vehicles"); U.S. Pat. No. 9,378,509 ("Methods, apparatus, and articles of manufacture to measure geographical features using an image of a geographical location"); U.S. Pat. No. 9,373,051 ("Statistical approach to identifying and tracking targets within captured image data"); U.S. Pat. No. 9,355,154 ("Media sequencing method to provide location-relevant entertainment"); U.S. Pat. No. 9,336,492 ("Modeling of re-moistening of stored grain crop for acceptable time-of-sale moisture level and opportunity windows for operation of storage bin fans based on expected atmospheric conditions"); U.S. Pat. No. 9,277,525 ("Wireless location using location estimators"); U.S. Pat. No. 9,269,022 ("Methods for object recognition and related arrangements"); U.S. Pat. No. 9,237,416 ("Interactive advisory system for prioritizing content"); U.S. Pat. No. 9,202,252 ("System and method for conserving water and optimizing land and water use"); U.S. Pat. No. 9,131,644 ("Continual crop development profiling using dynamical extended range weather forecasting with routine remotely-sensed validation imagery"); U.S. Pat. No. 9,113,590 ("Methods, apparatus, and systems for determining in-season crop status in an agricultural crop and alerting users"); U.S. Pat. No. 8,775,428 ("Method and apparatus for predicting object properties and events using similarity-based information retrieval and modeling"); U.S. Pat. No. 8,146,539 ("Method of reducing herbaceous fuels in areas susceptible to wildfires"); U.S. Pat. No. 7,764,231 ("Wireless location using multiple mobile station location techniques"); and U.S. Pub. No. 2016/0073573 ("Methods and systems for managing agricultural activities"). These documents are incorporated herein by reference to the extent not inconsistent herewith.

Figure 15:
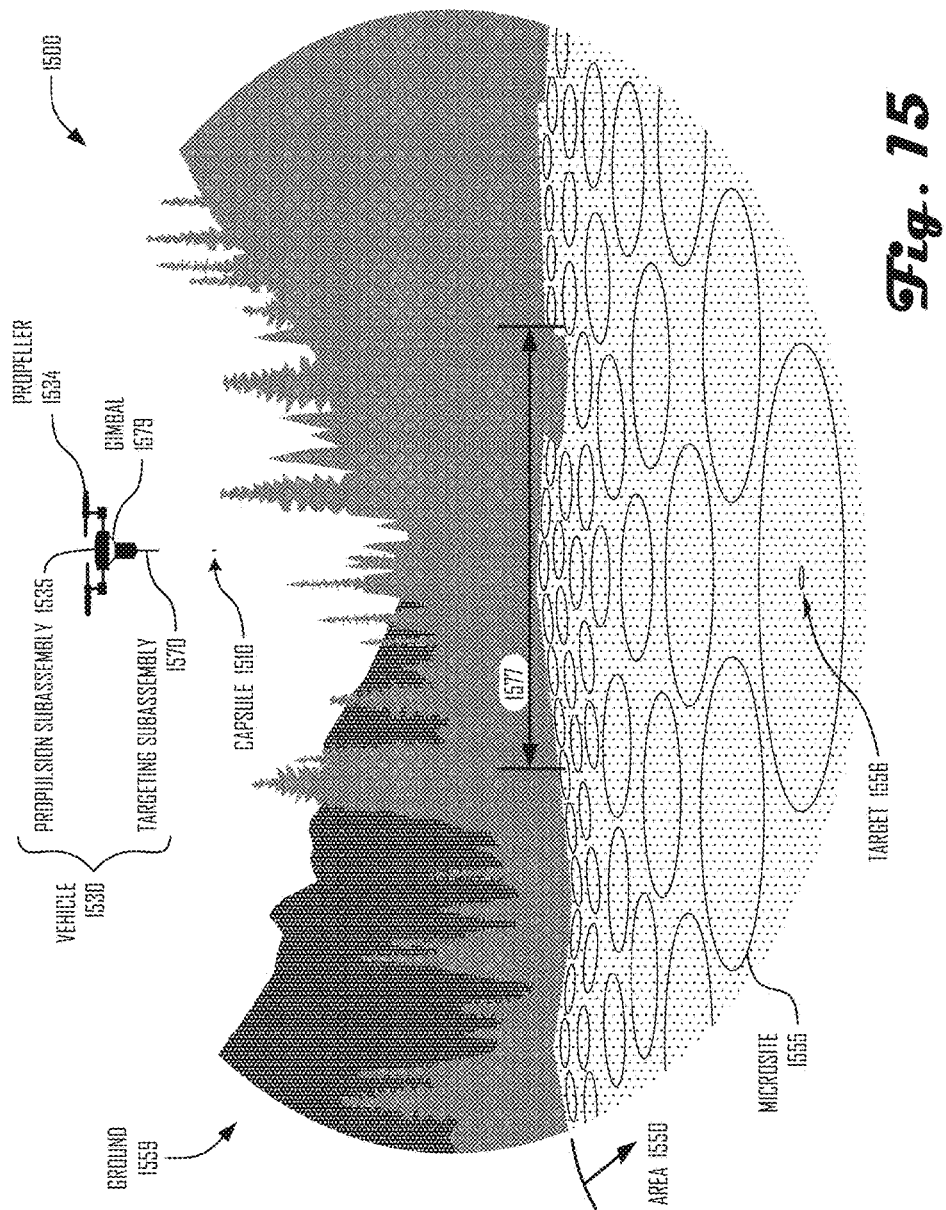
FIG. 15 illustrates an aerial deployment planting system configured to access microsites over irregular ground.
Figure 16:
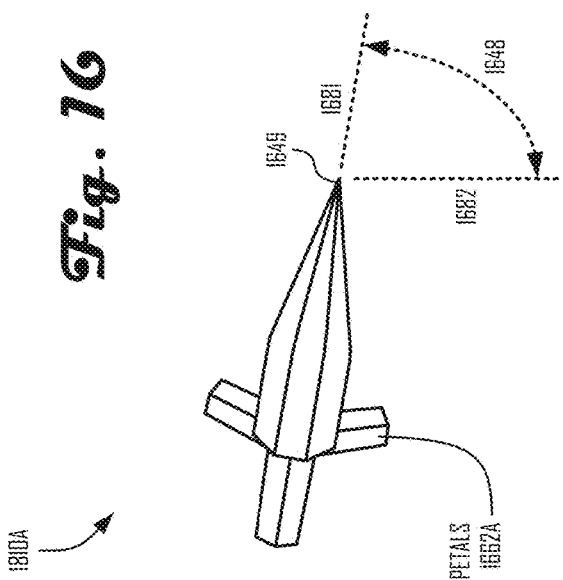
FIG. 16 illustrates an aerially deployed propagule capsule on a trajectory toward a target within a microsite.
Figure 17:
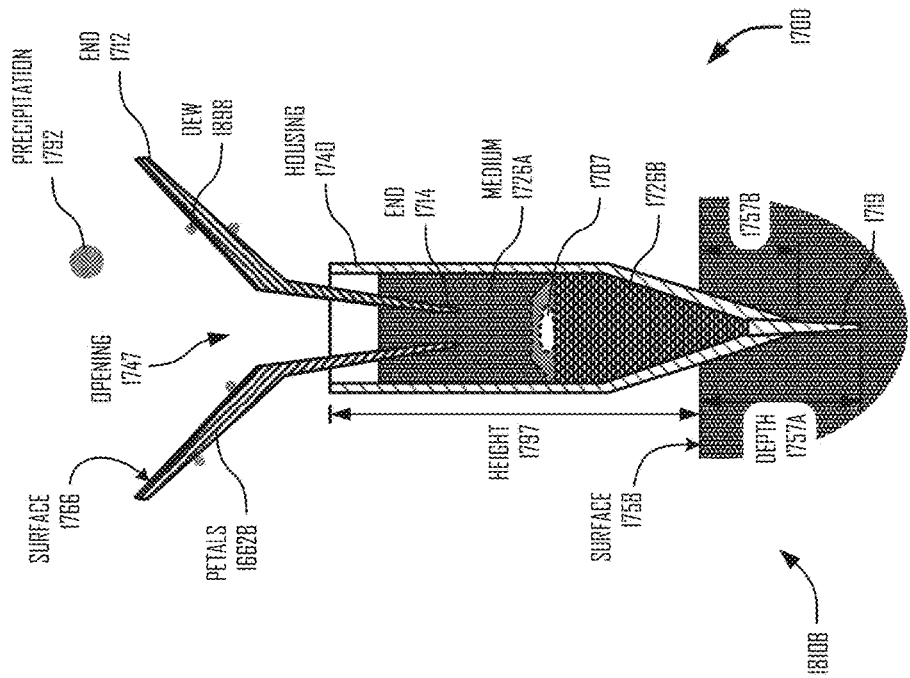
FIG. 17 illustrates an aerially deployed propagule capsule having landed within a microsite.

FIG. 15 illustrates an aerial deployment planting system 1500 configured to access microsites 1555 over irregular ground 1559. Each microsite 1555 in the area 1550 to be planted includes one or more propagule placement targets 1556 therein. As shown an unmanned vehicle 1530 includes a propulsion subassembly 1535 having a plurality of propellers 1534 or other limbs for ambulation. The propulsion subassembly 1535 supports a targeting subassembly 1570 (by one or more flexible gimbals 1579 therebetween) that has just deployed a seed capsule 1510. More generally such containment/targeting subassemblies may be gimbaled relative to the propulsion subassembly 1535 so as to stabilize the targeting subassembly 1570 while propagule capsules (like seed capsule 1510) are successively released aerially toward respective targets 1556 (smaller than a square meter, e.g.) while ambulating so that the respective targets 1556 come within a range 1577 of the targeting subassembly 1570.

FIG. 16 illustrates an aerially deployed propagule capsule 1810A presently traveling in a nearly horizontal direction 1681 on a trajectory toward a target 1556. As shown a drag coefficient of propagule capsule 1810A remains between 0.04 and 0.5 in flight primarily due to a plurality of outwardly-directed petals 1662A, which causes an angle 1648 of travel (relative to a downward direction 1682) to decrease steadily while the propagule capsule 1810A follows its trajectory. Such moderate drag coefficients allow a propagule capsule 1810 traveling in a primarily horizontal direction 1681 (i.e. having an angle between 45 and 135 degrees relative to a downward direction 1682) to right itself before landing (i.e. so that it lands in a primarily vertical direction). This allows an anterior protrusion 1649 to penetrate a ground surface significantly enough so that capsule 1810 can remain upright. This can occur, for example, in a context in which moisture collectors atop the capsule 1810 (petals 1662A, e.g.) would not otherwise work effectively (so as to foster and not stunt seedling growth) during the critical task of plant root egress for finding a reliable water supply.

FIG. 17 illustrates an aerially deployed propagule capsule having landed within a microsite 1556. Because an anterior protrusion (tip 1719) has penetrated a ground surface 1758 significantly (by a depth 1757A of more than 5 mm, e.g.) enough so that capsule 1810B is likely to remain upright for more than 3 weeks, one or more propagules therein are likely to survive as long as there is sufficient harvestable dew 1898 or other available precipitation 1792 collectable via the one or more petals 1662B of capsule 1810B. Propagule capsule 1810 is configured to include one or more growth media 1726A-B that serve as artificial moisture-transfer conduits between proximal ends 1714 of the petals 1662 and the moisture-directing surfaces 1766 thereof. This allows precipitation 1792 (rain or snow, e.g.) or other moisture (artificial hydration delivered by unmanned drones, e.g.) to be directed all the way from the distal ends 1712 of the petals 1662B into a primary opening 1747 atop a housing 1740 and through to the propagule(s) 1707. In some contexts such artificial above-ground-moisture collectors (petals 1662B, e.g.) for a single propagule capsule 1810B collectively have a total surface area larger than 3 square centimeters, wherein each of the artificial above-ground-moisture collector(s) is near enough to at least one of the one or more artificial moisture-transfer conduits (media 1726, e.g.) so that capillary action therebetween can occur). As shown housing 1740 configured to support (at least one of) the one or more moisture-transfer media 1726A-B is adjacent the one or more propagules 1707, allowing above-ground-moisture (rain 1892 or dew 1898, e.g.) from the one or more artificial above-ground-moisture collectors 1821 to flow via the moisture-transfer media 1726 to the one or more propagules 1707.

In some contexts such petals 1662B may comprise a latticed layer of wire (a fine mesh, e.g.) with numerous holes therethrough each within 1-2 orders of magnitude of 0.5 millimeters in width/diameter so as to allow (optionally hydrophobic) surfaces 1766 thereof to have a higher effective moisture collection area per unit of air drag coefficient. In some variants, moreover, one or more propagules 1707 may be held within a chamber that provides protection (from wind and solar desiccation and propagule predation, e.g.) by having a largest opening 1747 larger than 1 square millimeter and smaller than 10 square centimeters and with all other openings thereof smaller than 3 square millimeters. Seed predation may be further reduced, in some variants, by having a housing 1740 configured to extend to a minimum height 1797 greater than 3 centimeters above the surrounding ground surface 1758. Moreover in some variants a porous or other hydration conduit/collector comprises a portion of housing 1740 that extends underground to a depth 1757B greater than 0.2 millimeters, with at least some of the housing 1740 below surface 1758 being configured to serve as an additional moisture collector as a function of capillarity and moisture gradients between the surface of housing 1740 and the edaphic environment.

Figure 18:
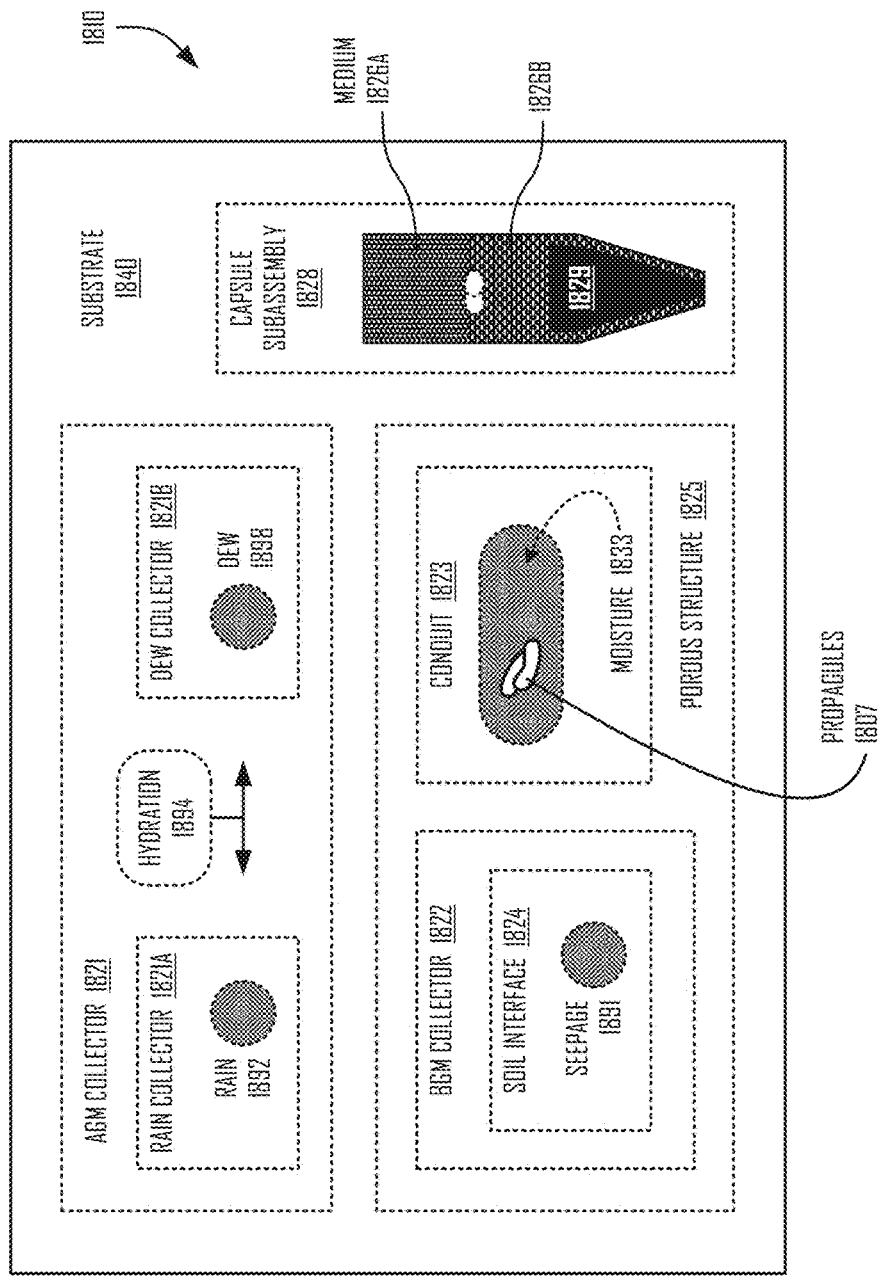
FIG. 18 schematically illustrates various configurations of propagule capsules.

FIG. 18 schematically illustrates various configurations of propagule capsules 1810. In some variants an aerial deployment planting system comprises a propagule capsule 1810 configured to contain one or more propagules 1707 and one or more artificial moisture collectors. These may include one or more above-ground-moisture collectors 1821 or one or more below-ground-moisture collectors 1822 (or both). Such systems may also include one or more artificial moisture-transfer conduits 1823 and one or more substrates 1840 (implementing a housing 1740, e.g.) configured to support the one or more artificial moisture-transfer conduits 1823 adjacent the one or more propagules 1807 and thereby to facilitate rain 1892, dew 1898, seepage 1891, capillary action, or other moisture 1833 having timely and persistent access to the one or more propagules 1807 (throughout the germination and early seedling growth phases, e.g.).

In some contexts, seepage 1891 is a best-available source of moisture 1833, necessitating a below-ground-moisture collector (a tip 1719 having primarily longitudinal capillaries therethrough, e.g.) intimately coupled with a moist soil or ground-based substrate (e.g. woody detritus) interface 1824 (by deep placement, e.g.). Alternatively or additionally, a single porous structure 1825 may serve as both a below-ground moisture collector 1822 and a conduit 1823 in direct contact with the propagule(s) 1823. In some variants, moreover, a mass-produced capsule subassembly 1828 may be made of a harder medium 1826A pressed toward and fused with a softer medium 1826B with one or more propagules therebetween. Alternatively or additionally, one or more such media 1826 may include a cavity 1829 (an air-filled recess, e.g.) larger than 1 milliliter. In some contexts, moreover, artificial hydration 1894 delivered (as a conditional response to several hot, dry days following a capsule deployment, e.g.) via a hydration deployment (drone route, e.g.) may pass to ailing propagules 1807 via an artificial rain collector 1821A, an artificial dew collector 1821B, or an artificial below-ground-moisture collector 1822 (or via a combination of these).

FIG. 19 illustrates a system 1900 (suitable for use with/in an unmanned vehicle, e.g.) comprising a payload of an unmanned vehicle, a targeting subassembly in the process of deploying a propagule capsule 1810C having a length 1946 of about 3 centimeters. In some variants the propagule capsule 1810C may have bullet-like or similar funnel shape (having a wide back/top end 1912 and a front half that tapers to a pointed front/bottom end 1914, e.g.). A cartridge 1988 as shown (or a hopper or other selectively-dispensing container) contains dozens (or more) of other capsules 1810 (instantiating a seed magazine 188, e.g.) aboard the same vehicle. A gimbal 1979 is configured to stabilize the targeting subassembly (relative to a dynamic propulsion assembly 1535, e.g.) during deployment. In the deployment, the propagule capsule 1810C passed through a staging subassembly 1990 comprising a release mechanism 1985 or a secondary gimbal 1989 (configured to make fine adjustments to a direction 1681 of an endmost portion of a tube, barrel, or other chute 1914, e.g.). Because chute 1978 is much easier to move (optionally having an angular moment of inertia smaller than 1 kilogram-meters^2, e.g.) than a main portion of the unmanned vehicle, a suitable actuator thereof can make an adjustment (to an angle 1648 of travel at a moment of release, e.g.) of two degrees or more very quickly (in less than 100 milliseconds, e.g.).

In some contexts such cartridges may be mass produced and kept in a climate-controlled environment with a humidity and temperature therein both artificially maintained below suitable setpoints (the setpoint being below 80% and 80 degrees Fahrenheit respectively, e.g.) until less than 24 hours before they are mounted (on an unmanned vehicle configured to perform individual capsule deployment, e.g.). Alternatively or additionally, some such cartridges may be configured to be opened so that one or more propagule capsules 1810 therein are thereby modified inside the cartridge 1988 (by exposing propagule capsules 1810 therein to artificial heating or hydration, e.g.) within 24 hours before an individual deployment of a particular one of the propagule capsules 1810 therein.

FIG. 20 illustrates the system 1900 of FIG. 19 in which a targeting assembly thereof is preparing to deploy another propagule capsule 1810D. There it can be seen that a backside 2086 of a capsule-containing cartridge 1988 may be configured to be opened (temporarily removed, e.g.) so as to allow one or more propagule capsules 1810 therein thereby to be modified inside the cartridge 1988 (by adding petals 1662, coatings, or other capsule components via posterior openings 1747 thereof, e.g.) within 24 hours of an individual capsule deployment. This can occur, for example, in a context in which many experimental treatments upon capsules 1810 therein (or subassemblies 1828 thereof) to ascertain how yields might be improved would otherwise be possible only on a very limited scale (because of long lead times required for cost-effective mass production of capsule subassemblies, e.g.). Alternatively or additionally, the cartridge 1988 may (optionally) implement a gravity-fed hopper in which propagule capsules 1810 therein are all (nominally) aligned in parallel (in a downwardly diagonal direction 2096, e.g.).

In some variants, moreover, one or more changes to a structure or composition of each propagule capsule 1810 may be made successively within a staging subassembly 1990 (of an unmanned vehicle 1530, e.g.) en route. This can occur, for example, in a context in which a staging subassembly 1990 is configured to puncture or otherwise cut into most or all propagule capsules 1810 from a given cartridge 1988 successively during a single deployment of the unmanned vehicle 1530. In some variants, for example, a staging subassembly 1990 may be configured to alter a structure or composition (or both) of the first propagule capsule 1810C before deploying the first propagule capsule 1810C and also configured to alter a structure or composition of a second propagule capsule 1810D less than one minute after deploying the first propagule capsule 1810C and less than one minute before deploying the second propagule capsule 1810C.

Alternatively or additionally, a (variant of a) staging subassembly 1990 may be configured (1) to open a first valve 2083 so that a propagule capsule 1810D (pushed by loader 2065, e.g.) can approach a staging position, (2) to allow the staging subassembly 1990 to engage the propagule capsule 1810D at a staging position therein, (3) to finely aim a chute 1978 of a targeting subassembly 1570 toward a target 1556, and (4) to allow the staging subassembly 1990 to release the propagule capsule 1810D via the finely-aimed chute 1978 so that the propagule capsule 1810D has a precisely controlled direction 2081 relative to a downward direction. This can occur, for example, in a context in which one or more cameras 2006 of the payload has a field 2076 of view that overlaps an endmost portion of chute 1978 and in which an applied propellant pressure (from canister 2062, e.g.) that accelerates the propagule capsule 1810D is controlled or taken into account (or both) when deciding when to release the propagule capsule 1810D toward the target 1556 and in which (one or more solenoids, servos, or other motor controls of) gimbal 1989 finely tunes the release angle of chute 1978 using image data obtained from the one or more cameras 2006.

Figure 21:
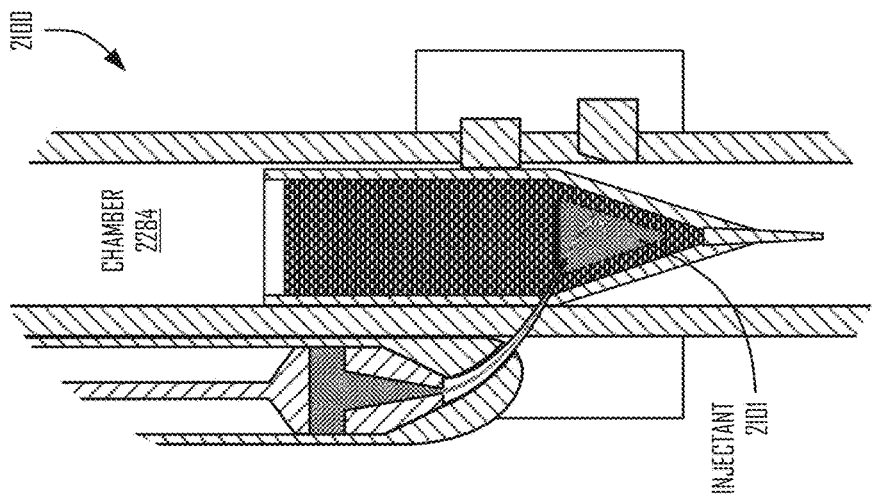
FIG. 21 illustrates a system in which a propagule capsule is being staged for deployment.

FIG. 21 illustrates a system 2100 in which a propagule capsule 2110 (optionally as an instance of capsule 1810, e.g.) is being staged for deployment via a release mechanism 2185 that includes several actuators 2133A-D. Prior to the configuration of FIG. 21, one or more actuators 2133B-C were retracted (upward and rightward, e.g.) enough to allow propagule capsule 2110 to drop freely into the staging position as shown. This allows one or more positioning actuator 2133D (in a leftward/engaged position as shown) to engage the propagule capsule 2110 so as to stop the downward motion. With the propagule capsule 2110 there, one or more puncture actuators 2133B are allowed to move into an engaged position (downward as shown) so that (a housing 2140 of) propagule capsule 2110 is laterally punctured (by syringe 2136 as shown, e.g.). In some contexts one or more simultaneous additional punctures (so as to allow an escape of displaced air, e.g.) may be appropriate, not shown. Finally one or more plungers (instances of actuator 2133A, e.g.) are actuated (by a downward motion thereof, e.g.).

Figure 22:
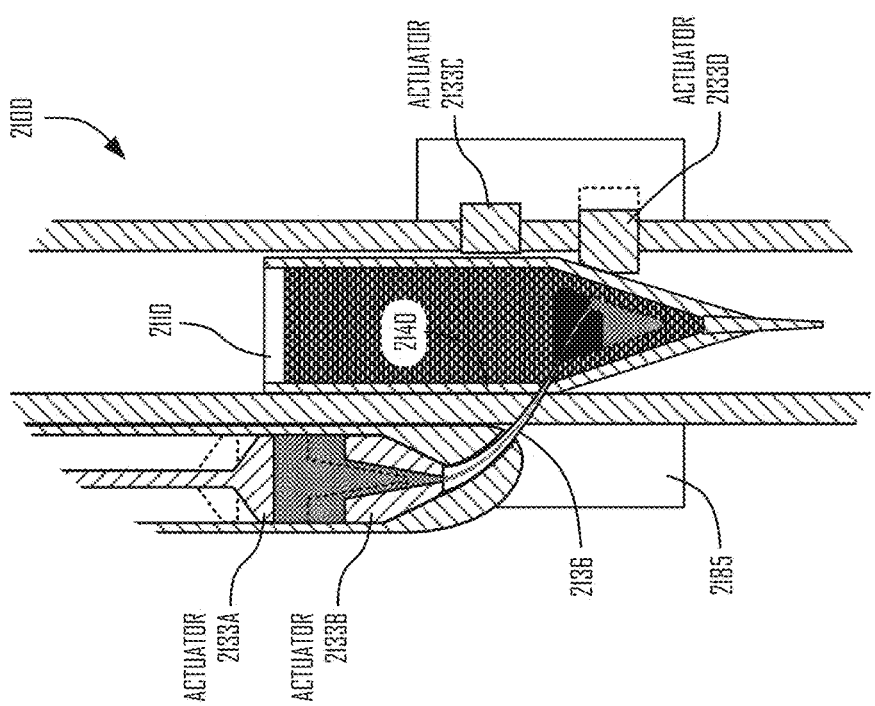
FIG. 22 illustrates the system of FIG. 21 in which the propagule capsule is in a more advanced state of staging.

FIG. 22 illustrates the system of FIG. 21 in which the propagule capsule is in a more advanced state of staging by virtue of an injectant 2101 (a water-containing mixture or gel, e.g.) nearly filling up a chamber 1829 of the propagule capsule 2110. Meanwhile another valve is opened so that chamber 2284 is pressurized to a calibrated firing pressure (greater than 2 atmospheres, e.g.) from a pressurized canister 2062 aboard the unmanned vehicle. And when special-purpose aiming circuitry determines that a present position of chute 1978 is sufficiently on target a slight (rightward) movement of one or more release actuators 2133C allows the propagule capsule 2110 to accelerate rapidly toward its target 1556.

In some variants one or more systems 1500, 1900, 2100 described herein implement a staging subassembly 1990 configured to alter a composition of a propagule capsule 2110 (as an instance of one or more other capsules 1810 described herein, e.g.) by depositing an injectant 2101 into the first propagule capsule before deploying (releasing or shooting, e.g.) the first propagule capsule and also configured to alter a composition of a second propagule capsule by depositing the injectant 2101 into the second propagule capsule less than one minute after deploying the first propagule capsule 1810C and less than one minute before deploying the second propagule capsule. This can occur, for example, in a context in which any such modification (as an injectant 2101, e.g.) would not otherwise be feasible because of a premature structural degradation of its housing 2110 that would prevent a successful targeting and ground penetration of adequate depth 1757.

FIG. 23 illustrates a system 2300 comprising a just-deployed propagule capsule 1810 about to undergo degradation (a rupture of housing 2340 similar to other substrates 1840 described herein, e.g.) induced by moisture. This can occur, for example, in a context in which a dry weight majority of an artificial moisture-transfer conduit 1823 thereof is a growing medium constructed and arranged to undergo a volumetric expansion of more than 20% when hydrated (like that of compressed and dried peat when saturated with water, e.g.). Alternatively or additionally, in a context in which a substrate 1840 includes a housing 1740, 2340 that advantageously balances initial structural integrity (i.e. upon individual capsule deployment) with preventing compression damage upon the one or more propagules by having (at least) a longitudinal housing portion thereof (a water-soluble adhesive within a seam 2308, e.g.) having an aqueous solubility greater than 5 grams per liter. Such features may be used to accelerate a rupturing of the substrate 1840 that makes possible an egress of one or more roots through the substrate 1840. See FIG. 24. Moreover in some variants a soil-contacting exterior surface 2368A may be absorbent enough to soak water up from surrounding soil.

FIG. 24 illustrates the deployed propagule capsule of FIG. 23 having undergone a significant degradation induced by the moisture (hours or days after deployment, e.g.). A growing medium 1726C, having absorbed significant moisture, has therefore a volumetric expansion of more than 20% when hydrated (like that of compressed and dried peat when saturated with water, e.g.). This can be accelerated in an instance where a mass-produced capsule subassembly of a particular type (make and model, e.g.) has been seen to suffer low yield and in which a capsule treatment affecting capsule composition or structure (or both) within 24 hours of individual capsule deployment may enhance yields, for example. By whatever protocol, it is generally desirable to balance initial structural integrity (i.e. upon individual capsule deployment) with other factors that may promote higher survival rates or similar biometrics as described above (such as by increasing instances of rupture 2406 by which root egress, especially in a downward direction, may occur more often). See FIGS. 25-26.

Figure 25:
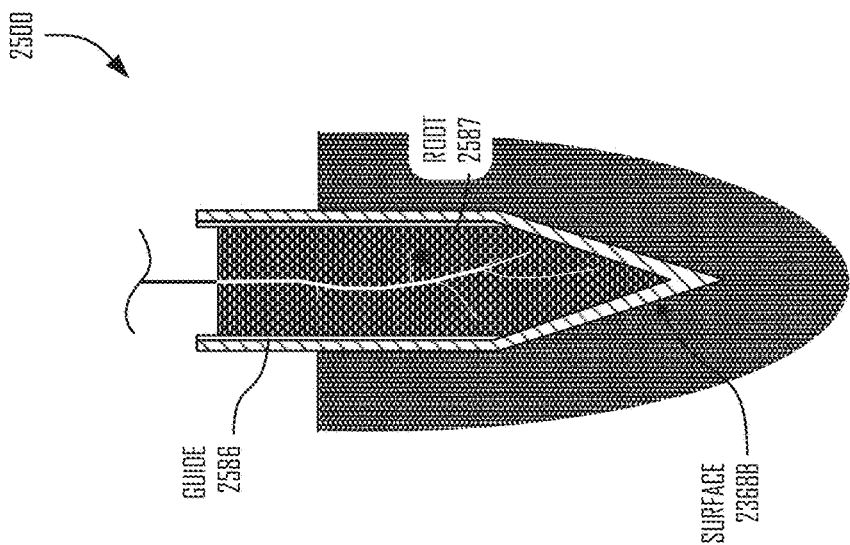
FIG. 25 illustrates a deployed propagule capsule having one or more root-guiding structures.

FIG. 25 illustrates a deployed propagule capsule 1810 in which a housing 1740, 2340 includes a plurality of substantially longitudinal guides 2586 (ribs or grooves more vertical than horizontal as shown, e.g.) so as to redirect (less productive) lateral root growth of the one or more (roots 2587 of) propagules 1707, 1807 downward (more productively). Alternatively or additionally, in some variants a soil-contacting exterior surface 2368B of the housing 2340 may be absorbent enough to soak water up from surrounding soil after capsule deployment, accelerating degradation of the housing 2340 and thereby facilitating root growth.

Figure 26:
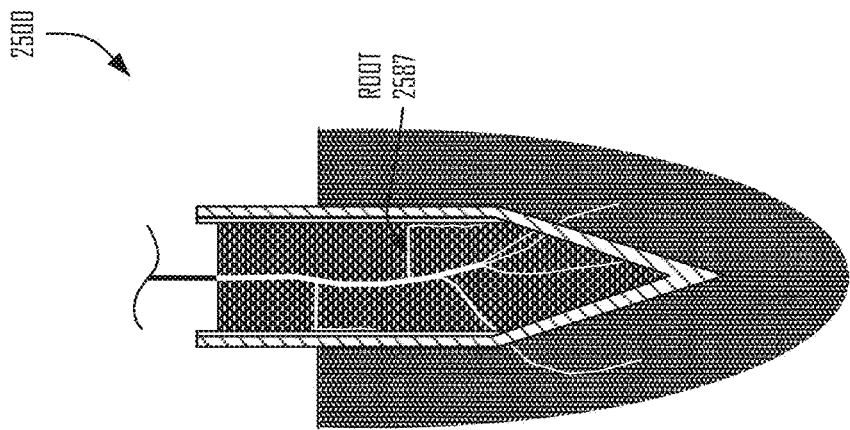
FIG. 26 illustrates the deployed propagule capsule of FIG. 25 in which the root-guiding structure(s) thereof have guided root growth.

FIG. 26 illustrates the deployed propagule capsule of FIG. 25 in which the root-guiding structure(s) thereof have guided root growth that was initially lateral to travel downward instead.

FIG. 27 illustrates a flow chart of operations relating to aerial deployment planting. Operation 2715 describes gathering data (special-purpose circuitry aboard a reconnaissance drone 1131 or other unmanned vehicle 1530 gathering raw data 820 of materials on a planting area 250, 1550 that includes the first microsite 255, 1555, e.g.).

Operation 2720 describes storing the data (special-purpose circuitry at station 1135 storing the raw data 820 of the materials on the planting area 250, 1550 that includes the first microsite 255, 1555, e.g.).

Operation 2730 describes qualifying the first microsite as a suitable planting area (special-purpose circuitry at station 1135 generating or accepting a decision to plant the area 250, 1550, e.g.).

Operation 2745 describes placing propagules into propagule capsules (special-purpose circuitry in factory robots assembling propagules 1807 into capsule subassemblies 1828 or capsule subassemblies into propagule capsules 1810, e.g.). This can occur, for example, in a context in which such assembly also includes loading cartridges 1988 with propagule capsules 1810.

Operation 2755 describes deploying an unmanned vehicle to the planting area with many loaded propagule capsules (special-purpose circuitry at station 1135 directing unmanned vehicle 1530 to commence a planting route for a next swath of planting area 1550, e.g.).

Operation 2760 commences a loop.

Operation 2770 describes determining that the unmanned vehicle is within range of an unplanted target (special-purpose circuitry aboard unmanned vehicle 1530 successfully moving so that a next planting target 1556 is currently within range 1577, e.g.).

Operation 2775 describes launching a propagule capsule targeted toward and landing within a corresponding microsite (special-purpose circuitry aboard unmanned vehicle 1530 successfully triggering a launch of a propagule capsule 1810 targeted toward and landing within a corresponding microsite 1555, e.g.).

Operation 2760 moves control to a next iteration of the loop unless all available microsites are planted or it is time to reload.

In light of teachings herein, numerous existing techniques may be applied for configuring special-purpose circuitry or other structures effective for configuring structures and materials as described herein without undue experimentation. See, e.g., U.S. Pub. No. 2018/0077855 ("Seed Planter Using Air Propulsion"), U.S. Pub. No. 2018/0075834 ("Noise Cancellation for Aerial Vehicle"), U.S. Pub. No. 2018/0035606 ("Smart Interactive and Autonomous Robotic Property Maintenance Apparatus, System, and Method (Finds Bare Spots, Uses Gimbal Gyroscope)"), U.S. Pub. No. 2018/0024570 ("Gimbaled Universal Drone Controller"), U.S. Pub. No. 2018/0024422 ("Gimbal Having Parallel Stability Mechanism"), U.S. Pub. No. 2018/0000028 ("Multi-Media Structures Containing Growth Enhancement Additives"), U.S. Pub. No. 2017/0359943 ("Automatic Target Recognition and Dispensing System"), U.S. Pub. No. 2017/0288976 ("Modules Registration and Status Update Of Modular Assembly System"), U.S. Pub. No. 2017/0286089 ("Firmware of Modular Assembly System"), U.S. Pub. No. 2017/0285927 ("Host Applications of Modular Assembly System"), U.S. Pub. No. 2017/0282091 ("Modular Assembly System"), U.S. Pub. No. 2017/0029109 ("Aircraft Seed Broadcasting Systems, Apparatus and Methods"), U.S. Pub. No. 2016/0234997 ("Systems and Methods for Aerial Seeding"), U.S. Pub. No. 2011/0303137 ("Seed Sensor System and Method for Improved Seed Count and Seed Spacing"), U.S. Pub. No. 2011/0035999 ("Structures and Methods for Attaching a Display Article to a Germinateable Seed and a Germinated Plant Carrying the Structure and/or the Display Article"), U.S. Pub. No. 2009/0107370 ("Planting Devices, Structures, and Methods"), and U.S. Pub. No. 2006/0042530 ("Product for and Method of Aerial Seeding Using Agglomerated Minerals"). These documents are incorporated herein by reference to the extent not inconsistent herewith.

With respect to the numbered clauses and claims expressed below, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. Also in the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES 1. (Independent) A time-sensitive forestry information management system comprising:

transistor-based circuitry (as a component of special-purpose circuitry 522, 622, e.g.) configured to obtain a current depiction 1025 (at least) of a land tract 250 that includes (at least) aerial photographic data 1389 (at least) from one or more aircraft 130, wherein a first location-specific artificial biometric 1102 of said depiction 1025 is associated with a first position 255 of said land tract, wherein a second location-specific artificial biometric of said depiction is associated with a second position 255 of said land tract, and wherein a third location-specific artificial biometric of said depiction is associated with a third position 255 of said land tract; and transistor-based circuitry (as a component of special-purpose circuitry 522, 622, e.g.) configured to receive a verdict 875 concerning (at least) said third position of said land tract (at least) from a first party 898A who has received an automatic prioritization 1151 of said third position over (at least) said first and second positions partly based on (at least) a current scalar value 1384 of said third location-specific artificial biometric of said depiction being within a range 277, partly based on a current scalar value of said first location-specific artificial biometric of said depiction being below said range, and partly based on a current scalar value of said second location-specific artificial biometric of said depiction being above said range, wherein (said scalar values and said depiction are "current" insofar that) all of said scalar values of said location-specific artificial biometrics resulted from the one or more aircraft having received (at least some) optical energy 1108 while airborne at a time T1 (time 291, e.g.) less than six months before a time T2 (time 292, e.g.) of the current depiction (for the aerial photographic data) and also less than six months before a time T3 (time 293, e.g.) of said verdict (being received).

2. The system of any of the above SYSTEM CLAUSES, further comprising:

a motorized drone (drone 1131, e.g.) supporting said transistor-based circuitry configured to obtain said current depiction of said land tract that includes aerial photographic data from one or more aircraft, wherein said first location-specific artificial biometric of said depiction is associated with said first position of said land tract, wherein said second location-specific artificial biometric of said depiction is associated with said second position of said land tract, and wherein said third location-specific artificial biometric of said depiction is associated with said third position of said land tract and said transistor-based circuitry configured to receive said verdict concerning said third position of said land tract from said first party who has received said automatic prioritization of said third position over said first and second positions partly based on said current scalar value of said third location-specific artificial biometric of said depiction being within said range, partly based on said current scalar value of said first location-specific artificial biometric of said depiction being below said range, and partly based on said current scalar value of said second location-specific artificial biometric of said depiction being above said range, wherein all of said scalar values of said location-specific artificial biometrics resulted from the one or more aircraft having received optical energy while airborne at said time T1 less than six months before said time T2 of the current depiction and also less than six months before said time T3 of said verdict.

3. The system of any of the above SYSTEM CLAUSES, further comprising:

a motor vehicle (vessel 230, e.g.) supporting said transistor-based circuitry configured to obtain said current depiction of said land tract that includes aerial photographic data from one or more aircraft, wherein said first location-specific artificial biometric of said depiction is associated with said first position of said land tract, wherein said second location-specific artificial biometric of said depiction is associated with said second position of said land tract, and wherein said third location-specific artificial biometric of said depiction is associated with said third position of said land tract and said transistor-based circuitry configured to receive said verdict concerning said third position of said land tract from said first party who has received said automatic prioritization of said third position over said first and second positions partly based on said current scalar value of said third location-specific artificial biometric of said depiction being within said range, partly based on said current scalar value of said first location-specific artificial biometric of said depiction being below said range, and partly based on said current scalar value of said second location-specific artificial biometric of said depiction being above said range, wherein all of said scalar values of said location-specific artificial biometrics resulted from the one or more aircraft having received optical energy while airborne at said time T1 less than six months before said time T2 of the current depiction and also less than six months before said time T3 of said verdict.

4. The system of any of the above SYSTEM CLAUSES, wherein the system is configured to perform any of the METHOD CLAUSES set forth herein.

5. (Independent) A time-sensitive forestry information management method comprising:

invoking transistor-based circuitry configured to obtain a current depiction 1025 of a land tract 250 that includes aerial photographic data 1389 from one or more aircraft 130, wherein a first location-specific artificial biometric 1102 of said depiction 1025 is associated with a first position 255 of said land tract, wherein a second location-specific artificial biometric of said depiction is associated with a second position 255 of said land tract, and wherein a third location-specific artificial biometric of said depiction is associated with a third position 255 of said land tract; and invoking transistor-based circuitry configured to receive a verdict 875 concerning said third position of said land tract from a first party who has received an automatic prioritization 1151 of said third position over said first and second positions partly based on a current scalar value 1384 of said third location-specific artificial biometric of said depiction being within a range 277, partly based on a current scalar value of said first location-specific artificial biometric of said depiction being below said range, and partly based on a current scalar value of said second location-specific artificial biometric of said depiction being above said range, wherein (said scalar values and said depiction are "current" insofar that) all of said scalar values of said location-specific artificial biometrics resulted from the one or more aircraft having received (at least some) optical energy 1108 while airborne at a time T1 (time 291, e.g.) less than six months before a time T2 (time 292, e.g.) of the current depiction (for the aerial photographic data) and also less than six months before a time T3 (time 293, e.g.) of said verdict (being received).

6. The method of any of the above METHOD CLAUSES, wherein the method includes all of the operations depicted in FIG. 7.

7. The method of any of the above METHOD CLAUSES, further comprising:

computing several distance estimates 1383 each as a corresponding one of said current scalar values of said first, second, and third location-specific artificial biometrics.

8. The method of any of the above METHOD CLAUSES, further comprising:

obtaining said range by allowing said first party to select said range from a menu and to define one or more conditions under which the first party is to be notified of said prioritization;

determining that the one or more conditions under which the first party is to be notified of said prioritization are met; and providing a conditional notification 1351 to the first party of said prioritization as an automatic and conditional response to the one or more conditions under which the first party is to be notified of said prioritization having been met.

9. The method of any of the above METHOD CLAUSES, further comprising:

configuring one or more sensors aboard the one or more aircraft to obtain other aerial photographic data by detecting other optical energy at least 24 hours at a prior time T0 before time T1 from said land tract;

configuring said one or more sensors aboard the one or more aircraft to obtain said aerial photographic data by detecting said optical energy at said time T1 from said land tract; and obtaining said first, second, and third location-specific artificial biometrics of said depiction as a component of the current depiction at least by comparing said photographic data from said time T1 against the other photographic data from said prior time T0.

10. The method of any of the above METHOD CLAUSES, further comprising:

configuring one or more sensors aboard the one or more aircraft to obtain said aerial photographic data by detecting said optical energy at or before said time T1 from said land tract.

11. The method of any of the above METHOD CLAUSES, further comprising:

configuring one or more sensors aboard the one or more aircraft to obtain said aerial photographic data by detecting said optical energy at or before said time T1 from said land tract; and using at least some additional aerial photographic data taken after said time T1 and before said time T2 of the current depiction in configuring the current depiction.

12. The method of any of the above METHOD CLAUSES, further comprising:

configuring one or more sensors aboard the one or more aircraft to obtain said aerial photographic data by detecting said optical energy at or before said time T1 from said land tract; and including at least some additional aerial photographic data taken after said time T1 and before said time T2 of the current depiction in the current depiction.

13. The method of any of the above METHOD CLAUSES, further comprising:
   determining that said current scalar value of said first location-specific artificial biometric of said depiction is below said range;
   determining that said current scalar value of said second location-specific artificial biometric of said depiction is above said range; and
   determining that said current scalar value of said third location-specific artificial biometric of said depiction is within said range.

14. The method of any of the above METHOD CLAUSES, further comprising:
   receiving at least a component of said range from said first party before the current depiction of said land tract is obtained and before said first party receives said automatic prioritization of said third position over said first and second positions.

15. The method of any of the above METHOD CLAUSES, further comprising:
   receiving at least a component of said range from a second party 898B before the current depiction of said land tract is obtained and before said first party receives said automatic prioritization of said third position over said first and second positions.

16. The method of any of the above METHOD CLAUSES, further comprising:
   allowing a second party to configure one or more sensors aboard the one or more aircraft and to select and to configure said range (as one menu option among a plurality of menu options, e.g.) before the current depiction of said land tract is obtained and before said first party receives said automatic prioritization (as a conditional notification 1351, e.g.) of said third position over said first and second positions.

17. The method of any of the above METHOD CLAUSES, further comprising:
   obtaining a positive decision 901 concerning one or more drone routes 923 that selectively include said third position (to distribute Douglas fir seeds selectively to a target planting region that includes said third position, e.g.) as a component of said verdict (excluding either the first or second region, e.g.).

18. The method of any of the above METHOD CLAUSES, further comprising:
   obtaining a negative planting decision 902 (not to plant said third position, e.g.) as a component of said verdict.

19. The method of any of the above METHOD CLAUSES, further comprising:
   obtaining an organic species identification 903 as a component of said verdict.

20. The method of any of the above METHOD CLAUSES, further comprising:
   obtaining a payload module identifier 921 (a serial number identifying a sensor-containing or payload item to be carried by an aircraft, e.g.) as a component of said verdict.

21. The method of any of the above METHOD CLAUSES, further comprising:
   obtaining a drone-executable command sequence 922 (mapping a flight and material deposition pattern executable by a particular drone, e.g.) as a component of said verdict.

22. The method of any of the above METHOD CLAUSES, further comprising:
   obtaining an herbicide identification 931 as a component of said verdict.

23. The method of any of the above METHOD CLAUSES, further comprising:
   obtaining a pesticide identification 932 as a component of said verdict.

24. The method of any of the above METHOD CLAUSES, further comprising:
   obtaining a therapeutic bioactive material identification 935 as a component of said verdict.

25. The method of any of the above METHOD CLAUSES, further comprising:
   obtaining a crop species identification 943 (naming "Douglas fir" in lieu of a deciduous crop tree, e.g.) as a component of said verdict.

26. The method of any of the above METHOD CLAUSES, further comprising:
   obtaining a dataset 1377B-C having a minimum value as said current scalar value 1471 of said first location-specific artificial biometric of said depiction 1025, a maximum value as said current scalar value 1472 of said second location-specific artificial biometric of said depiction, and an intermediate value 1473 as said current scalar value of said third location-specific artificial biometric of said depiction; and
   deriving said range as having a lower limit (limit 261, e.g.) above said minimum value and below said intermediate value and as having an upper limit (limit 263, e.g.) above said intermediate value and below said maximum value.

27. The method of any of the above METHOD CLAUSES, further comprising:
   obtaining a dataset 1377B-C having a minimum value as said current scalar value 1471 of said first location-specific artificial biometric of said depiction 1025, a maximum value as said current scalar value 1472 of said second location-specific artificial biometric of said depiction, and an intermediate value 1473 as said current scalar value of said third location-specific artificial biometric of said depiction; and
   deriving said range as having a lower limit (limit 261, e.g.) halfway between said minimum value and said intermediate value and as having an upper limit (limit 263, e.g.) halfway between said intermediate value and said maximum value.

28. The method of any of the above METHOD CLAUSES, wherein said depiction 1025 includes said automatic prioritization 1151 and wherein said automatic prioritization 1151 ranks said third position above said first and second positions as a conditional response to said third location-specific artificial biometric of said depiction being within said range and to said first and second location-specific artificial biometrics of said depiction being outside said range.

29. The method of any of the above METHOD CLAUSES, wherein said prioritization 1151 manifests a conditional notification 1351 sent in response to said third location-specific artificial biometric of said depiction being within said range and to said first and second location-specific artificial biometrics of said depiction being outside said range.

30. The method of any of the above METHOD CLAUSES, wherein a server receives said verdict at time T3 within a month of both said time T1 at which said optical energy was detected and said time T2 at which said current depiction was generated.

31. The method of any of the above METHOD CLAUSES, wherein a server receives said verdict at time T3 within a week of both said time T1 at which said optical energy was detected and said time T2 at which said current depiction was generated.

32. The method of any of the above METHOD CLAUSES, wherein a server receives said verdict at time T3 within 24 hours of both said time T1 at which said optical energy was detected and said time T2 at which said current depiction was generated.

33. The method of any of the above METHOD CLAUSES, wherein a server receives said verdict at time T3 within 3 hours of both said time T1 at which said optical energy was detected and said time T2 at which said current depiction was generated.

34. The method of any of the above METHOD CLAUSES, wherein said obtaining said depiction of said land tract that includes aerial photographic data from one or more aircraft comprises:

selectively including in said depiction an aerial photograph 1387 of at least a part of said land tract that overlaps said third position while selectively omitting from said depiction at least a portion of said photographic data that depicts the first or second positions of said land tract as a component of automatically prioritizing said third position over said first and second positions partly based on said current scalar value of said third location-specific artificial biometric of said depiction being within said range, partly based on said current scalar value of said first location-specific artificial biometric of said depiction being below said range, and partly based on said current scalar value of said second location-specific artificial biometric of said depiction being above said range.

35. The method of any of the above METHOD CLAUSES, wherein said obtaining said depiction of said land tract that includes aerial photographic data from one or more aircraft comprises:

selectively including in said depiction 1025 an aerial photograph 1387 of at least a part of said land tract 250 that overlaps said third position 255 while selectively omitting from said depiction at least a portion of said photographic data that depicts the first or second positions of said land tract.

36. The method of any of the above METHOD CLAUSES, wherein said receiving said verdict 875 concerning said third position of said land tract from said first party who has received said automatic prioritization of said third position over said first and second positions partly based on said current scalar value of said third location-specific artificial biometric of said depiction being within a range, partly based on said current scalar value of said first location-specific artificial biometric of said depiction being below said range, and partly based on said current scalar value of said second location-specific artificial biometric of said depiction being above said range comprises:

selectively including in said depiction an aerial photograph 1387 of at least a part of said land tract that overlaps said third position while selectively omitting from said depiction at least a portion of said photographic data that depicts the first or second positions of said land tract as a component of automatically prioritizing said third position over said first and second positions partly based on said current scalar value of said third location-specific artificial biometric of said depiction being within said range, partly based on said current scalar value of said first location-specific artificial biometric of said depiction being below said range, and partly based on said current scalar value of said second location-specific artificial biometric of said depiction being above said range.

37. The method of any of the above METHOD CLAUSES, further comprising:

acting upon said verdict (by initiating a planting, material distribution, or supplemental surveillance task, e.g.).

38. (Independent) An aerial deployment planting method, comprising:

placing one or more (seeds or other) propagules 1707 in a first propagule capsule 1810 (at operation 2745, e.g.); and deploying propagules 1810 from an unmanned vehicle (at operation 2770 via aircraft 130, e.g.) so that each is targeted toward and lands within a corresponding microsite 255, 1555, wherein the propagule capsules 1810 include the first propagule capsule and wherein the first propagule capsule is targeted and lands within a first one of the microsites 255, 1555.

39. The aerial deployment planting method of any of the above METHOD CLAUSES, wherein deploying the propagule capsules comprises:

firing the propagule capsules with a pneumatic firing apparatus (including an interchangeable compressed gas canister 162, 1962, e.g.) aboard the unmanned vehicle 1530 (at operation 2775, e.g.).

40. The aerial deployment planting method of any of the above METHOD CLAUSES, wherein deploying the propagule capsules comprises:

gathering data 820 of materials on a planting area 250, 1550 that includes the first microsite 255, 1555 (at operation 2715, e.g.);

storing the data 820 of the materials on the planting area 250, 1550 that includes the first microsite 255, 1555 (at operation 2720, e.g.); and qualifying the first microsite as a suitable planting area (at operation 2730, e.g.).

41. The aerial deployment planting method of any of the above METHOD CLAUSES, wherein deploying the propagule capsules comprises:

performing a reconnaissance phase (at operations 2715-2730, e.g.) in which an unmanned vehicle 1530 collects data 820 that is processed and used for mapping at least one route 923 for planting;

along the at least one route 923 for planting determining that the unmanned vehicle is within a shooting range 1577 of the microsites 255, 1555 corresponding to each of the propagule capsules 1810 (at operation 2770, e.g.); and performing a planting phase in which the unmanned vehicle 1530 launches the propagule capsules 1810 to the microsites (at operation 2775, e.g.).

42. The aerial deployment planting method of any of the above METHOD CLAUSES, wherein placing the one or more propagules in a first propagule capsule 1810 comprises:

constructing the first propagule capsule 1810 to include a (housing 1740 or other) substrate 1840 composed of a non-toxic biodegradable material (polyvinyl alcohol, e.g.).

43. (Independent) An aerial deployment planting system comprising:

a first propagule capsule 1810 configured to contain one or more propagules and to be supported by an unmanned vehicle 1530, the first propagule capsule 1810 comprising:

one or more artificial moisture-transfer conduits 1823;

one or more artificial above-ground-moisture collectors 1821 having a total surface area larger than 3 square centimeters each operably coupled with at least one of the one or more artificial moisture-transfer conduits 1823 (i.e. wherein each of the one or more artificial above-ground-moisture collectors 1821 is near enough to at least one of the one or more artificial moisture-transfer conduits 1823 so that capillary action therebetween can occur); and a first substrate 1840 (implementing a housing 1740, e.g.) configured to support the one or more moisture-transfer conduits 1823 adjacent the one or more propagules 1807 and to allow above-ground-moisture (rain 1892 or dew 1898, e.g.) from the one or more artificial above-ground-moisture collectors 1821 to flow via the one or more artificial moisture-transfer conduits 1823 to the one or more propagules 1707, wherein the first propagule capsule 1810 is configured to be deployed aerially from the unmanned vehicle 1530.

44. (Independent) An aerial deployment planting system comprising:

a first propagule capsule 1810 configured to contain one or more propagules 1707 and to be supported by an unmanned vehicle 1530, the first propagule capsule 1810 comprising:

one or more absorbent below-ground-moisture collectors 1822 including a first artificial below-ground-moisture collector 1822A;

one or more artificial moisture-transfer conduits 1823; and a first substrate 1840 (implementing a housing 1740, e.g.) configured to support the one or more artificial moisture-transfer conduits 1823 adjacent the one or more propagules 1807 and to allow below-ground seepage 1891 from the one or more absorbent below-ground-moisture collectors 1822 to flow by wicking (capillary action, e.g.) via the one or more artificial moisture-transfer conduits 1823 to the one or more propagules 1707.

45. The aerial deployment planting system of any of the above PLANTING SYSTEM CLAUSES, comprising:

a drone propulsion subassembly 1535 having one or more robotic limbs (propellers 1534 or legs, e.g.) configured to allow the first unmanned vehicle 1530 to ambulate (walk or fly, e.g.) over irregular ground 1559 (inaccessible by a tractor, e.g.), wherein the drone propulsion subassembly 1535 supports dozens of propagule capsules 1810 including first propagule capsule 1810A.

46. (Independent) An aerial deployment planting system comprising:

a first unmanned vehicle 1530 having a drone propulsion subassembly 1535, the drone propulsion subassembly 1535 having one or more robotic limbs (propellers 1534 or legs, e.g.) configured to allow the first unmanned vehicle 1530 to ambulate (walk or fly, e.g.) over irregular ground 1559 (inaccessible by a tractor, e.g.), wherein the drone propulsion subassembly 1535 supports dozens of propagule capsules 1810 including a first propagule capsule 1810A; and a first targeting subassembly 1570 gimbaled relative to the drone propulsion subassembly 1535 so as to stabilize the first targeting subassembly 1570 while the first propagule capsule 1810 is released aerially (via chute 1678, e.g.) toward a target 1556 smaller than a square meter.

47. The aerial deployment planting system of any of the above PLANTING SYSTEM CLAUSES, wherein a front-most 25% of a length 1946 of the first propagule capsule 1810 includes a narrowest portion of the first propagule capsule 1810 and wherein a middle half of the length 1946 of the first propagule capsule 1810 (a longitudinal section closer to a midpoint than an endpoint thereof, e.g.) includes a widest portion of the first propagule capsule 1810.

48. The aerial deployment planting system of any of the above PLANTING SYSTEM CLAUSES, wherein a front-most 25% of a length 1946 of the first propagule capsule 1810 includes a narrowest portion of the first propagule capsule 1810 and wherein a rear half of the length 1946 of the first propagule capsule 1810 includes a widest portion (including petals 1662, e.g.) of the first propagule capsule 1810.

49. The aerial deployment planting system of any of the above PLANTING SYSTEM CLAUSES, wherein a weight majority of the one or more artificial moisture-transfer conduits 1823 (i.e. by weight when dry) comprise one or more fiber-based growing media 1726.

50. The aerial deployment planting system of any of the above PLANTING SYSTEM CLAUSES, wherein the one or more artificial moisture-transfer conduits 1823 include a concentration of bloodmeal therein within a factor of ten of 0.2% (by weight).

51. The aerial deployment planting system of any of the above PLANTING SYSTEM CLAUSES, wherein a majority the one or more artificial moisture-transfer conduits 1823 (by weight when dry) comprise one or more growing media 1726 each selected from the group consisting of rock wool, perlite, vermiculate, expanded clay, biochar, coco chips, coco fiber, sawdust, sand, and pumice.

52. The aerial deployment planting system of any of the above PLANTING SYSTEM CLAUSES, wherein a first substrate 1840 configured to support one or more artificial moisture-transfer conduits 1823 adjacent the one or more propagules 1807 thereof includes a housing 1740 that advantageously balances a crash damage vulnerability (structural integrity upon deployment, e.g.) with preventing compression damage upon the one or more propagules 1707 (that would result if none of the casing were water soluble, e.g.) by dissolving enough to rupture as a conditional response to being wet for more than a (nominal) time T, wherein T is greater than 1 hour and less than 1000 hours.

53. The aerial deployment planting system of any of the above PLANTING SYSTEM CLAUSES, wherein a first substrate 1840 configured to support one or more artificial moisture-transfer conduits 1823 adjacent the one or more propagules 1807 thereof includes a housing 1740, 2340 that advantageously balances initial structural integrity (i.e. upon deployment) with preventing compression damage upon the one or more propagules by having (at least) a longitudinal housing portion thereof (a water-soluble adhesive within a seam 2308, e.g.) having an aqueous solubility greater than 5 grams per liter.

54. The aerial deployment planting system of any of the above PLANTING SYSTEM CLAUSES, wherein a first substrate 1840 configured to support one or more artificial moisture-transfer conduits 1823 adjacent the one or more propagules 1807 thereof includes a housing 1740 having a plurality of substantially longitudinal guides 2586 (ribs or grooves more axial than lateral in direction, e.g.) so as to guide root egress of the one or more (roots 2587 of) propagules 1707, 1807 downward as they grow.

55. The aerial deployment planting system of any of the above PLANTING SYSTEM CLAUSES, wherein a first substrate 1840 configured to support one or more artificial moisture-transfer conduits 1823 adjacent the one or more propagules 1807 thereof includes a housing 1740 that is separable from a tip 1719 of the first substrate 1840 and wherein the tip 1719 of the first substrate 1840 has a mass on the order (i.e. within an order of magnitude) of 1 gram.

56. The aerial deployment planting system of any of the above PLANTING SYSTEM CLAUSES, wherein a first substrate 1840 configured to support one or more artificial moisture-transfer conduits 1823 adjacent the one or more propagules 1807 thereof includes a housing 1740 and a tip 1719 of the first substrate 1840 and wherein the tip 1719 of the first substrate 1840 is made of a tubular and biodegradable material.

57. The aerial deployment planting system of any of the above PLANTING SYSTEM CLAUSES, wherein a first substrate 1840 configured to support one or more artificial moisture-transfer conduits 1823 adjacent the one or more propagules 1807 thereof includes a housing 1740 and a tip 1719 of the first substrate 1840 and wherein the tip 1719 engages a forward-most portion of the housing 1740 by a friction fit.

58. The aerial deployment planting system of any of the above PLANTING SYSTEM CLAUSES, wherein a first substrate 1840 configured to support one or more artificial moisture-transfer conduits 1823 adjacent the one or more propagules 1807 thereof includes a housing 1740 and a tip 1719 of the first substrate 1840 and wherein the tip 1719 of the first substrate 1840 is made of a porous and biodegradable injection molded plastic.

59. The aerial deployment planting system of any of the above PLANTING SYSTEM CLAUSES, wherein a first substrate 1840 configured to support one or more artificial moisture-transfer conduits 1823 adjacent the one or more propagules 1807 thereof includes a housing 1740 that is separable from a tip 1719 of the first substrate 1840 and wherein the tip 1719 of the first substrate 1840 is made of a porous and biodegradable injection molded plastic.

60. The aerial deployment planting system of any of the above PLANTING SYSTEM CLAUSES, wherein the first propagule capsule 1810 has a funnel shape (generally tapering from a wider top end 1912 to a pointed bottom end 1914, e.g.).

61. The aerial deployment planting system of any of the above PLANTING SYSTEM CLAUSES, wherein one or more artificial moisture-transfer conduits 1823 of the first propagule capsule 1810 are integrally formed with one or more artificial above-ground-moisture collectors 1821 (as an integrated porous structure 1825, e.g.).

62. The aerial deployment planting system of any of the above PLANTING SYSTEM CLAUSES, wherein one or more artificial moisture-transfer conduits 1823 of the first propagule capsule 1810 are integrally formed with one or more absorbent below-ground-moisture collectors 1822 (as an integrated porous structure 1825, e.g.).

63. The aerial deployment planting system of any of the above PLANTING SYSTEM CLAUSES, wherein the first propagule capsule 1810 includes two or more petal-shaped above-ground-moisture collectors 1821A-B.

64. The aerial deployment planting system of any of the above PLANTING SYSTEM CLAUSES, wherein the first propagule capsule 1810 includes one or more above-ground-moisture collectors 1821A-B that extend laterally (relative to an axis thereof while traveling in a forward direction 1681 or planted in a downward direction 1682, e.g.) far enough to create drag (by a lateral distance of more than 1 mm, e.g.) upon the first propagule capsule 1810 so as to enhance an orientation of the first propagule capsule 1810 during flight.

65. The aerial deployment planting system of any of the above PLANTING SYSTEM CLAUSES, wherein the first propagule capsule 1810 includes an above-ground-moisture collector 1821 having a hydrophobic surface 1766 (at least) on an upper/posterior surface 1766 thereof.

66. The aerial deployment planting system of any of the above PLANTING SYSTEM CLAUSES, wherein the first propagule capsule 1810 includes an above-ground-moisture collector 1821 having a hydrophobic coating (at least) on a posterior surface 1766 thereof.

67. The aerial deployment planting system of any of the above PLANTING SYSTEM CLAUSES, wherein the first propagule capsule 1810 includes an above-ground-moisture collector 1821 having a hydrophobic coating (at least) on a lateral surface thereof.

68. The aerial deployment planting system of any of the above PLANTING SYSTEM CLAUSES, wherein the first propagule capsule 1810 includes an above-ground-moisture collector 1821 having a latticed layer of wire with numerous holes (i.e. at least 200) therethrough each within an order of magnitude of 0.5 mm in width.

69. The aerial deployment planting system of any of the above PLANTING SYSTEM CLAUSES, wherein the first propagule capsule 1810 includes an above-ground-moisture collector 1821 having a latticed layer of wire (a fine mesh, e.g.) with numerous holes therethrough each within an order of magnitude of 0.05 mm in width.

70. The aerial deployment planting system of any of the above PLANTING SYSTEM CLAUSES, wherein the first propagule capsule 1810 has a drag coefficient greater than 0.04 and less than 0.5 in flight right before landing.

71. The aerial deployment planting system of any of the above PLANTING SYSTEM CLAUSES, wherein the first propagule capsule 1810 has a chamber in which a first propagule of the one or propagules is held and wherein the chamber advantageously balances chamber access with protection (from wind desiccation and propagule predation, e.g.) by having only a single largest opening 1747 larger than 1 square millimeter and smaller than 10 square millimeters.

72. The aerial deployment planting system of any of the above PLANTING SYSTEM CLAUSES, wherein the first propagule capsule 1810 includes an above-ground-moisture collector 1821 having a diagonally-extending posterior surface 1766 configured to guide condensed dew 1898 toward an opening 1747 in the first propagule capsule 1810.

73. The aerial deployment planting system of any of the above PLANTING SYSTEM CLAUSES, wherein the first propagule capsule 1810 includes an above-ground-moisture collector 1821 having a diagonally-extending posterior surface 1766 configured to deflect falling precipitation 1792 (snow or rain, e.g.) toward an opening 1747 in the first propagule capsule 1810.

74. The aerial deployment planting system of any of the above PLANTING SYSTEM CLAUSES, wherein the first propagule capsule 1810 includes an above-ground-moisture collector 1821 configured to contain above-ground water (rain 1892 or an artificial hydration 1894 in a catch basin, e.g.).

75. The aerial deployment planting system of any of the above PLANTING SYSTEM CLAUSES, wherein the first propagule capsule 1810 (includes the first below-ground-moisture collector 1822 and) is configured to be deployed aerially from the unmanned vehicle so that the first below-ground-moisture collector 1822 (one or more of housing 1740 or tip 1719, e.g.) penetrates a ground surface 1758 by more than 0.2 millimeters (extending to a depth 1757 of about 1 centimeter, e.g.).

76. The aerial deployment planting system of any of the above PLANTING SYSTEM CLAUSES, wherein the unmanned vehicle is an unmanned aerial vehicle equipped with a global positioning system (GPS) 171, a hyperspectral image sensor 172, a LIDAR/LADAR sensor 173, an inertial navigation system (INS) processor (implementing CPU 128, e.g.), and a memory unit (memory storage 174, e.g.).

77. The aerial deployment planting system of any of the above PLANTING SYSTEM CLAUSES, wherein the first propagule capsule 1810 includes one or more propagules 1707, an anterior protrusion 1649 configured to penetrate a ground surface 1758, and one or more artificial moisture-transfer conduits 1823 adjacent the one or more propagules 1807 configured to allow seepage 1891 to flow therethrough to the one or more propagules 1707.

78. The aerial deployment planting system of any of the above PLANTING SYSTEM CLAUSES, wherein the first propagule capsule 1810 contains a cavity 1829 (an air-filled recess, e.g.) larger than 1 milliliter.

79. The aerial deployment planting system of any of the above PLANTING SYSTEM CLAUSES, wherein the unmanned vehicle includes a staging subassembly 1990 configured (1) to alter the first propagule capsule 1810C before releasing the first propagule capsule 1810C and (2) to alter a second propagule capsule 1810D less than one minute after releasing the first propagule capsule 1810C and less than one minute before releasing the second propagule capsule 1810C.

80. The aerial deployment planting system of any of the above PLANTING SYSTEM CLAUSES, wherein the unmanned vehicle includes a staging subassembly 1990 configured to alter a composition of the first propagule capsule 1810C before deploying the first propagule capsule 1810C and also configured to alter a composition of a second propagule capsule 1810D less than one minute after deploying the first propagule capsule 1810C and less than one minute before deploying the second propagule capsule 1810C.

81. The aerial deployment planting system of any of the above PLANTING SYSTEM CLAUSES, wherein the unmanned vehicle includes a staging subassembly 1990 configured to alter a composition of the first propagule capsule 1810C by depositing an injectant 2101 into the first propagule capsule 1810C before deploying (releasing or shooting, e.g.) the first propagule capsule 1810C and also configured to alter a composition of a second propagule capsule 1810D by depositing the injectant 2101 into the second propagule capsule 1810D less than one minute after deploying the first propagule capsule 1810C and less than one minute before deploying the second propagule capsule 1810C.

82. The aerial deployment planting system of any of the above PLANTING SYSTEM CLAUSES, comprising a staging subassembly 1990 configured to cut into several propagule capsules 1810 aboard the unmanned vehicle 1530 during a single deployment (flight or planting route, e.g.) of the unmanned vehicle 1530.

83. The aerial deployment planting system of any of the above PLANTING SYSTEM CLAUSES, comprising a staging subassembly 1990 configured to puncture several propagule capsules 1810 during a single deployment (flight or planting route, e.g.) of the unmanned vehicle 1530.

84. The aerial deployment planting system of any of the above PLANTING SYSTEM CLAUSES, comprising a cartridge 1988 configured to allow a first propagule capsule 1810 to leave the cartridge 1988 while dozens (i.e. at least 24) of other propagule capsules 1810 are all nominally aligned in parallel (in a downwardly diagonal direction 2096, e.g.).

85. The aerial deployment planting system of any of the above PLANTING SYSTEM CLAUSES, comprising:

a drone propulsion subassembly 1535 having one or more robotic limbs (propellers 1534 or legs, e.g.) configured to allow the first unmanned vehicle 1530 to ambulate (walk or fly, e.g.); and a targeting subassembly 1570 having a steerable chute 1978 and one or more actuators (a solenoid or other motor control in gimbal 1989, e.g.) configured to adjust an angle of the steerable chute 1978 relative to the drone propulsion subassembly 1535 by more than one degree in less than 100 milliseconds.

86. The aerial deployment planting system of any of the above PLANTING SYSTEM CLAUSES, comprising a staging subassembly 1990 having a plurality of actuators 2133C-D and configured to perform a method comprising:

opening a first valve 2083 so that a propagule capsule 2110 (pushed by loader 2065, e.g.) can approach a staging position;

allowing a first actuator 2133D of the staging subassembly 1990 to engage the propagule capsule 2110 at a staging position;

allowing a second actuator 2133C of the staging subassembly 1990 to engage the propagule capsule 2110 (at one or more side walls thereof, e.g.);

allowing the first actuator 2133D of the staging subassembly 1990 to disengage the propagule capsule 2110 (by moving more than 1 millimeter laterally, e.g.);

aiming a targeting subassembly 1570 of the unmanned vehicle 1530 toward a target 1556 (in consideration of a developed pressure in chamber 2284 and a current angle and direction 2081 of a release chute 1978 thereof; and allowing the second actuator 2133C of the staging subassembly 1990 to release the propagule capsule 2110.

87. The aerial deployment planting system of any of the above PLANTING SYSTEM CLAUSES, comprising a staging subassembly 1990 having a plurality of actuators 2133C-D and configured (with special-purpose circuitry thereof, e.g.) to perform a method comprising:

opening a first valve 2083 so that a propagule capsule 2110 (pushed by loader 2065, e.g.) can approach a staging position;

allowing a first actuator 2133D of the staging subassembly 1990 to engage the propagule capsule 2110 at a staging position;

closing the first valve 2083 and allowing an elevated pressure to build up between the first valve 2083 and the propagule capsule 2110 (by opening another valve between a pressurized canister 2062 and chamber 2284, e.g.);

allowing a second actuator 2133C of the staging subassembly 1990 to engage the propagule capsule 2110 (at one or more side walls thereof, e.g.);

allowing the first actuator 2133D of the staging subassembly 1990 to disengage the propagule capsule 2110 (by moving more than 1 millimeter laterally, e.g.);

aiming a targeting subassembly 1570 of the unmanned vehicle 1530 toward a target 1556 (in consideration of a developed pressure in chamber 2284 and a current angle and direction 2081 of a release chute 1978 thereof; and allowing the second actuator 2133C of the staging subassembly 1990 to release the propagule capsule 2110.

88. The aerial deployment planting system of any of the above PLANTING SYSTEM CLAUSES, comprising a staging subassembly 1990 having a plurality of actuators 2133A-D and configured to perform a method comprising:

opening a first valve 2083 so that a propagule capsule 2110 (pushed by loader 2065, e.g.) can approach a staging position;

allowing a first actuator 2133D of the staging subassembly 1990 to engage the propagule capsule 2110 at a staging position;

closing the first valve 2083 and allowing an elevated pressure to build up between the first valve 2083 and the propagule capsule 2110 (by opening another valve between a pressurized canister 2062 and chamber 2284, e.g.);

allowing a second actuator 2133B of the staging subassembly 1990 to puncture the propagule capsule 2110 (at one or more side walls thereof, e.g.);

allowing a third actuator 2133A of the staging subassembly 1990 to deposit injectant 2101 (a hydrating liquid or gel, e.g.) into the propagule capsule 2110 via a syringe 2136;

allowing the second actuator 2133B of the staging subassembly 1990 to withdraw the syringe 2136 from the one or more side walls of the propagule capsule 2110;

allowing a fourth actuator 2133C of the staging subassembly 1990 to engage the propagule capsule 2110 (at one or more side walls thereof, e.g.);

allowing the first actuator 2133D of the staging subassembly 1990 to disengage the propagule capsule 2110 (by moving more than 1 millimeter laterally, e.g.);

aiming a targeting subassembly 1570 of the unmanned vehicle 1530 toward a target 1556 (in consideration of a developed pressure in chamber 2284 and a current angle and direction 2081 of a release chute 1978 thereof; and allowing the fourth actuator 2133C of the staging subassembly 1990 to release the propagule capsule 2110.

89. The aerial deployment planting system of any of the above PLANTING SYSTEM CLAUSES, wherein a dry weight majority of an artificial moisture-transfer conduit 1823 is a growing medium 1726C configured to undergo a volumetric expansion of more than 20% when hydrated (saturated with water, e.g.).

90. The aerial deployment planting system of any of the above PLANTING SYSTEM CLAUSES, wherein a dry weight majority of an artificial moisture-transfer conduit 1823 is made of (at least partly) dehydrated compressed peat, a growing medium 1726C configured to undergo a volumetric expansion of more than 20% (a transition like that depicted in FIGS. 23-24, e.g.) when hydrated.

91. The aerial deployment planting system of any of the above PLANTING SYSTEM CLAUSES, wherein one or more changes to a structure or composition of a propagule capsule 1810 are made within a staging subassembly 1990 (of an unmanned vehicle 1530, e.g.).

92. The aerial deployment planting system of any of the above PLANTING SYSTEM CLAUSES, wherein a capsule-containing cartridge 1988 is configured to be opened and wherein one or more propagule capsules 1819 therein are thereby modified inside the cartridge 1988 (by exposing propagule capsules 1810 therein to artificial heating or hydration, e.g.) shortly before a deployment of a first one of the propagule capsules 1810 therein.

93. The aerial deployment planting system of any of the above PLANTING SYSTEM CLAUSES, wherein a backside 2086 of a capsule-containing cartridge 1988 is configured to be opened (removed, e.g.) and wherein one or more propagule capsules 1819 therein are thereby modified inside the cartridge 1988 (by adding petals 1662, coatings, or other capsule components via posterior openings 1747 thereof, e.g.) within 24 hours of a deployment of a first one of the propagule capsules 1810 therein.

94. The aerial deployment planting system of any of the above PLANTING SYSTEM CLAUSES, wherein a propagule capsule includes a plurality of coniferous tree seeds as propagules.

95. The aerial deployment planting system of any of the above PLANTING SYSTEM CLAUSES, wherein a propagule capsule includes a plurality of coniferous tree seeds as propagules.

96. The aerial deployment planting system of any of the above PLANTING SYSTEM CLAUSES, wherein an exterior surface 2368A-B of the first propagule capsule 1810 includes a soil-contacting portion of the first below-ground-moisture collector 1822 larger than 1 square centimeter.

97. The aerial deployment planting system of any of the above PLANTING SYSTEM CLAUSES, wherein an exterior surface 2368A-B of the first propagule capsule 1810 includes a soil-contacting portion of the first below-ground-moisture collector 1822 larger than 1 square centimeter and configured to absorb more than 5 microliters of liquid per hour from surrounding (adjacent) soil by wicking.

98. The aerial deployment planting system of any of the above PLANTING SYSTEM CLAUSES, wherein a weight majority of an endmost portion (a forwardmost part of housing 1740 with tip 1719, e.g.) longer than 0.5 mm of the first propagule capsule 1810 comprises one or more types of natural fiber (wood fiber, e.g.).

99. The aerial deployment planting system of any of the above PLANTING SYSTEM CLAUSES, wherein an endmost portion (a forwardmost part of housing 1740 with tip 1719, e.g.) longer than 0.5 mm of the first propagule capsule 1810 has a footprint (a maximum cross-sectional area, e.g.) of about 2 square millimeters.

100. The aerial deployment planting system of any of the above PLANTING SYSTEM CLAUSES, wherein an endmost portion (a forwardmost part of housing 1740 with tip 1719, e.g.) longer than 0.5 mm of the first propagule capsule 1810 is porous.

101. The aerial deployment planting system of any of the above PLANTING SYSTEM CLAUSES, wherein the first propagule capsule 1810 is less than 20% (hydrogel-constituent or other) water by weight when the first propagule capsule 1810 is deployed (fired or otherwise released, e.g.) by the unmanned vehicle 1530.

102. The aerial deployment planting system of any of the above PLANTING SYSTEM CLAUSES, wherein more than 15% (by weight) of the first propagule capsule 1810 is a hydrogel when the first propagule capsule 1810 is deployed by the unmanned vehicle 1530.

103. The aerial deployment planting system of any of the above PLANTING SYSTEM CLAUSES, wherein the one or more propagules 1707, 1807 comprise a dormant seed of a coniferous tree (a pine, e.g.).

104. An aerial deployment planting method using any one of the above PLANTING SYSTEM CLAUSES, wherein all of the components of that one PLANTING SYSTEM CLAUSE are used in the method.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

What is claimed is:

1. An aerial deployment planting system comprising:
a first propagule capsule configured to contain one or more propagules and to be supported by an unmanned vehicle, said first propagule capsule comprising:

one or more absorbent below-ground-moisture collectors including a first absorbent below-ground-moisture collector;
one or more artificial moisture-transfer conduits; and
a first substrate configured to support said one or more artificial moisture-transfer conduits adjacent said one or more propagules and to allow below-ground seepage from said one or more absorbent below-ground-moisture collectors that extend more than 0.2 millimeters (mm) below a ground surface to flow by wicking via said one or more artificial moisture-transfer conduits to said one or more propagules, wherein a dry weight majority of at least one of said one or more artificial moisture-transfer conduits is dehydrated compressed peat or another growing medium configured to undergo a volumetric expansion of more than 20% when hydrated, wherein an exterior surface of said first propagule capsule includes a soil-contacting portion of said first absorbent below-ground-moisture collector larger than 1 square centimeter and configured to absorb more than 5 microliters of liquid per hour directly from surrounding soil by wicking, wherein an endmost portion longer than 0.5 mm of said first propagule capsule has a footprint of about 2 square mm, wherein said first propagule capsule is less than 5% water by weight, and wherein said one or more propagules comprise a dormant seed of a tree.

2. The aerial deployment planting system of claim 1, wherein a weight majority of said endmost portion of said first propagule capsule comprises one or more types of natural fiber.

3. An aerial deployment planting system comprising:
a first propagule capsule configured to contain one or more propagules and to be supported by an unmanned vehicle, said first propagule capsule comprising:
one or more absorbent below-ground-moisture collectors including a first absorbent below-ground-moisture collector;
one or more artificial moisture-transfer conduits; and
a first substrate configured to support said one or more artificial moisture-transfer conduits adjacent said one or more propagules and to allow below-ground seepage from said one or more absorbent below-ground-moisture collectors that extend more than 0.2 millimeters (mm) below a ground surface to flow by wicking via said one or more artificial moisture-transfer conduits to said one or more propagules.

4. The aerial deployment planting system of claim 3, wherein an exterior surface of said first propagule capsule includes a soil-contacting portion of said first absorbent below-ground-moisture collector larger than 1 square centimeter.

5. The aerial deployment planting system of claim 3, comprising:
a first unmanned vehicle having a drone propulsion subassembly, said drone propulsion subassembly having one or more robotic limbs configured to allow said first unmanned vehicle to ambulate, wherein said drone propulsion subassembly supports dozens of propagule capsules including said first propagule capsule; and
a first targeting subassembly gimbaled relative to said drone propulsion subassembly so as to stabilize said first targeting subassembly while said first propagule capsule is released aerially toward a ground surface target smaller than a square meter.

6. The aerial deployment planting system of claim 3, wherein said one or more artificial moisture-transfer conduits of said first propagule capsule are integrally formed with at least one of said one or more absorbent below-ground-moisture collectors.

7. The aerial deployment planting system of claim 3, wherein said first propagule capsule includes one or more above-ground-moisture collectors that protrude rearward from said first propagule capsule.

8. The aerial deployment planting system of claim 3, wherein said first propagule capsule includes one or more above-ground-moisture collectors that extend laterally by a lateral distance of more than 1 millimeter so as to create drag upon said first propagule capsule and thereby enhance an orientation of said first propagule capsule during flight.

9. The aerial deployment planting system of claim 3, wherein said first propagule capsule includes an above-ground-moisture collector having a hydrophobic surface on an upper surface thereof.

10. The aerial deployment planting system of claim 3, wherein said first propagule capsule includes an above-ground-moisture collector having a latticed layer of wire with numerous holes therethrough each within an order of magnitude of 0.5 mm in width.

11. The aerial deployment planting system of claim 3, wherein said first propagule capsule has a drag coefficient greater than 0.04 and less than 0.5 in flight before landing.

12. The aerial deployment planting system of claim 3, wherein said first propagule capsule is configured to be deployed aerially from said unmanned vehicle so that said first absorbent below-ground-moisture collector penetrates said ground surface by more than 5 mm.

13. The aerial deployment planting system of claim 3, wherein said unmanned vehicle includes a staging subassembly configured (1) to alter said first propagule capsule before releasing said first propagule capsule and (2) to alter a second propagule capsule less than one minute after releasing said first propagule capsule and less than one minute before releasing said second propagule capsule.

14. The aerial deployment planting system of claim 3, comprising a cartridge configured to allow said first propagule capsule to leave said cartridge while dozens of other propagule capsules remain therein, wherein a dry weight majority of a first artificial moisture-transfer conduit of said one or more artificial moisture-transfer conduits is a growing medium configured to undergo a volumetric expansion of more than 20% when hydrated.

15. The aerial deployment planting system of claim 3, wherein said first propagule capsule includes one or more coniferous tree seeds as said one or more propagules and wherein one or more propagule capsules therein have been modified inside said cartridge within 24 hours before a deployment of any of said propagule capsules therein.

16. The aerial deployment planting system of claim 3, comprising:
a drone propulsion subassembly having one or more robotic limbs configured to allow said first unmanned vehicle to ambulate; and
a targeting subassembly having a first steerable chute and one or more actuators configured to adjust an angle of said first steerable chute relative to said drone propulsion subassembly by more than one degree in less than 100 milliseconds.

17. The aerial deployment planting system of claim 3, wherein an endmost portion longer than 0.5 mm of said first propagule capsule has a footprint of about 2 square mm and wherein a weight majority of said endmost portion comprises one or more types of natural fiber.

18. An aerial deployment planting method comprising:
configuring a first propagule capsule to contain one or more propagules and to be deployed by an unmanned vehicle by assembling a first absorbent below-ground-moisture collector, one or more artificial moisture-transfer conduits, and a first substrate configured to support said one or more artificial moisture-transfer conduits adjacent said one or more propagules, wherein said one or more absorbent below-ground-moisture collectors are configured to allow below-ground seepage more than 0.2 millimeters below a ground surface to flow by wicking via said one or more artificial moisture-transfer conduits to said one or more propagules.

* * * * *